US010970282B2

(12) United States Patent
Funke et al.

(10) Patent No.: US 10,970,282 B2
(45) Date of Patent: *Apr. 6, 2021

(54) SYSTEMS, METHODS, AND DEVICES FOR MANAGING DATA SKEW IN A JOIN OPERATION

(71) Applicant: Snowflake Inc., San Mateo, CA (US)

(72) Inventors: Florian Andreas Funke, San Francisco, CA (US); Thierry Cruanes, San Mateo, CA (US); Benoit Dageville, Seattle, WA (US); Marcin Zukowski, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/005,182

(22) Filed: Jun. 11, 2018

(65) Prior Publication Data

US 2019/0377813 A1    Dec. 12, 2019

(51) Int. Cl.
| | | |
|---|---|---|
| *G06F 16/20* | (2019.01) | |
| *G06F 16/2453* | (2019.01) | |
| *G06F 16/22* | (2019.01) | |
| *G06F 16/2455* | (2019.01) | |

(52) U.S. Cl.
CPC .... *G06F 16/24544* (2019.01); *G06F 16/2255* (2019.01); *G06F 16/2456* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 2014/0280023 A1* | 9/2014 | Jagtap | G06F 16/24544 707/714 |
| 2015/0261820 A1 | 9/2015 | Cheng et al. | |
| 2016/0275078 A1 | 9/2016 | Attaluri et al. | |
| 2020/0125567 A1 | 4/2020 | Funke et al. | |

FOREIGN PATENT DOCUMENTS

WO    WO-2019241195 A1    12/2019

OTHER PUBLICATIONS

"International Application Serial No. PCT/US2019/036473, International Search Report dated Sep. 5, 2019", 2 pgs.

(Continued)

*Primary Examiner* — Kristopher Andersen
(74) *Attorney, Agent, or Firm* — Schwegman Lundberg & Woessner, P.A.

(57) ABSTRACT

Systems, methods, and devices, for managing data skew during a join operation are disclosed. A method includes computing a hash value for a join operation and detecting data skew on a probe side of the join operation at a runtime of the join operation using a lightweight sketch data structure. The method includes identifying a frequent probe-side join key on the probe side of the join operation during a probe phase of the join operation. The method includes identifying a frequent build-side row having a build-side join key corresponding with the frequent probe-side join key. The method includes asynchronously distributing the frequent build-side row to one or more remote servers.

21 Claims, 18 Drawing Sheets

(56) References Cited

OTHER PUBLICATIONS

"International Application Serial No. PCT/US2019/036473, Written Opinion dated Sep. 5, 2019", 8 pgs.

Cutt, "Improving Hash Join Performance by Exploiting Intrinsic Data Skew", University of British Columbia, Retrieved from the Internet: <https://pdfs.semanticscholar.org/e34c/5e389d68111835e6884bfaf46861798d71ec.pdf>, [retrieved on Aug. 10, 2019]., (2009), 1-60.

Metwally, Ahmed, et al., "Efficient Computation of Frequent and Top-k Elements in Data Streams", International Conference on Database Theory, this work was supported in part by NSF grants, (2005), 21 pgs.

Rodiger, et al., "Flow-Join: Adaptive Skew Handling for Distributed Joins over High-Speed Networks", IEEE 32nd International Conference on Data Engineering (ICDE), Retrieved from the Internet: <https://db.in.tum.de/-roediger/papers/roediger2016flowjoin.pdf> [retrieved on Aug. 10, 2019]., (2016), 1-12.

"U.S. Appl. No. 16/716,819, Examiner Interview Summary dated May 1, 2020", 3 pgs.

"U.S. Appl. No. 16/716,819, Non Final Office Action dated Feb. 12, 2020".

"U.S. Appl. No. 16/716,819, Final Office Action dated Aug. 21, 2020", 13 pgs.

"U.S. Appl. No. 16/716,819, Response Filed May 8, 2020 to Non Final Office Action dated Feb. 12, 2020", 15 pgs.

"U.S. Appl. No. 16/716,819, Response filed Oct. 20, 2020 to Final Office Action dated Aug. 21, 2020", 15 pgs.

U.S. Appl. No. 16/716,819, filed Dec. 17, 2019, Systems, Methods, and Devices for Managing Data Skew in a Join Operation.

"International Application Serial No. PCT/US2019/036473, International Preliminary Report on Patentability dated Dec. 24, 2020", 10 pgs.

\* cited by examiner

Build Side Table 302

| bKey 304 | bVal 306 |
|---|---|
| 42 | X |
| 11 | Y |
| 7 | Q |
| 512 | W |
| 123 | Z |

Probe Side Table 310

| pKey 312 | pVal 314 |
|---|---|
| 11 | e |
| 2 | a |
| 11 | o |
| 7 | i |
| 11 | u |
| 11 | b |
| 42 | d |
| 11 | h |
| 123 | g |
| 2003 | f |

Result Table 320 Where bKey = pKey

| bKey 304 | bVal 306 | pKey 312 | pVal 314 |
|---|---|---|---|
| 42 | X | 42 | d |
| 11 | Y | 11 | e |
| 11 | Y | 11 | o |
| 11 | Y | 11 | u |
| 11 | Y | 11 | b |
| 11 | Y | 11 | h |
| 7 | Q | 7 | i |
| 123 | Z | 123 | g |

FIG. 3

After Probing the Probe Side
600

Server One
401

Result R.1 (bKey = pKey)
602

| bKey | bVal | pKey | pVal |
|---|---|---|---|
| 11 | Y | 11 | e |
| 11 | Y | 11 | o |
| 7 | Q | 7 | i |
| 11 | Y | 11 | u |

Server Two
421

Result R.2 (bKey = pKey)
620

| bKey | bVal | pKey | pVal |
|---|---|---|---|
| 11 | Y | 11 | b |
| 42 | X | 42 | d |
| 11 | Y | 11 | h |
| 123 | Z | 123 | g |

| Final Result of Broadcast Join Operation bKey = pKey | | | |
|---|---|---|---|
| bKey | bVal | pKey | pVal |
| 11 | Y | 11 | b |
| 42 | X | 42 | d |
| 11 | Y | 11 | h |
| 123 | Z | 123 | g |
| 11 | Y | 11 | e |
| 11 | Y | 11 | o |
| 7 | Q | 7 | i |
| 11 | Y | 11 | u |

FIG. 7

After Hash Partitioning of Build Side 900

Server One 801

Partitioned Build Table B.1 902

| bKey | bVal |
|------|------|
| 42   | X    |
| 512  | W    |

*Build-side rows having an even-numbered join key are partitioned to server one.*

Probe Table P.1 810

| pKey | pVal |
|------|------|
| 11   | e    |
| 2    | a    |
| 11   | o    |
| 7    | i    |
| 11   | u    |

Server Two 821

Partitioned Build Table B.2 920

| bKey | bVal |
|------|------|
| 7    | Q    |
| 123  | Z    |
| 11   | Y    |

*Build-side rows having an odd-numbered join key are partitioned to server two.*

Probe Table P.2 830

| pKey | pVal |
|------|------|
| 11   | b    |
| 42   | d    |
| 11   | h    |
| 123  | g    |
| 2003 | f    |

FIG. 9

After Hash Partitioning of Probe Side 1000

Server One 801

Partitioned Build Table B.1 902

| bKey | bVal |
|------|------|
| 42   | X    |
| 512  | W    |

Partitioned Probe Table P.1 1010

| pKey | pVal |
|------|------|
| 2    | a    |
| 42   | d    |

Probe-side rows having an even-numbered join key are partitioned to server one.

Server Two 821

Partitioned Build Table B.2 920

| bKey | bVal |
|------|------|
| 7    | Q    |
| 123  | Z    |
| 11   | Y    |

Partitioned Probe Table P.2 1030

| pKey | pVal |
|------|------|
| 11   | b    |
| 11   | h    |
| 123  | g    |
| 2003 | f    |
| 11   | e    |
| 11   | o    |
| 11   | u    |

Probe-side rows having an odd-numbered join key are partitioned to server two.

FIG. 10

After Probing

Server One
801

Result R.1
1102

| bKey | bVal | pKey | pVal |
|------|------|------|------|
| 42   | X    | 42   | d    |

Server Two
821

Result R.2
1104

| bKey | bVal | pKey | pVal |
|------|------|------|------|
| 11   | Y    | 11   | b    |
| 11   | Y    | 11   | h    |
| 11   | Y    | 11   | e    |
| 11   | Y    | 11   | o    |
| 11   | Y    | 11   | u    |
| 123  | Z    | 123  | g    |

SYSTEMS, METHODS, AND DEVICES FOR MANAGING DATA SKEW IN A JOIN OPERATION

CROSS-REFERENCE TO RELATED APPLICATIONS

N/A.

TECHNICAL FIELD

The present disclosure relates to database query processing and more particularly relates to managing data skew in database a join operation.

BACKGROUND

Databases are widely used for data storage and access in computing applications. Databases may include one or more tables that include or reference data that can be joined, read, modified, or deleted using queries. Databases can store small or extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

A join operation may be conducted on database data and cause columns from one or more database tables to be merged. Relational databases are often normalized to eliminate duplication of information such as when an entity type may have one-to-many relationships with a plurality of other entity types. A join operation may be utilized to join entity types according to certain join predicates. A join operation may be utilized in response to a database query to return the appropriate entity types that are requested in the query.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 3 is a schematic diagram illustrating an example join operation according to an embodiment of the disclosure;

FIG. 6 is a schematic diagram illustrating an example join operation according to an embodiment of the disclosure;

FIG. 7 is a schematic diagram illustrating an example join operation according to an embodiment of the disclosure;

FIG. 9 is a schematic diagram illustrating an example join operation according to an embodiment of the disclosure;

FIG. 10 is a schematic diagram illustrating an example join operation according to an embodiment of the disclosure;

FIG. 11 is a schematic diagram illustrating an example join operation according to an embodiment of the disclosure;

DETAILED DESCRIPTION

Figure 1:
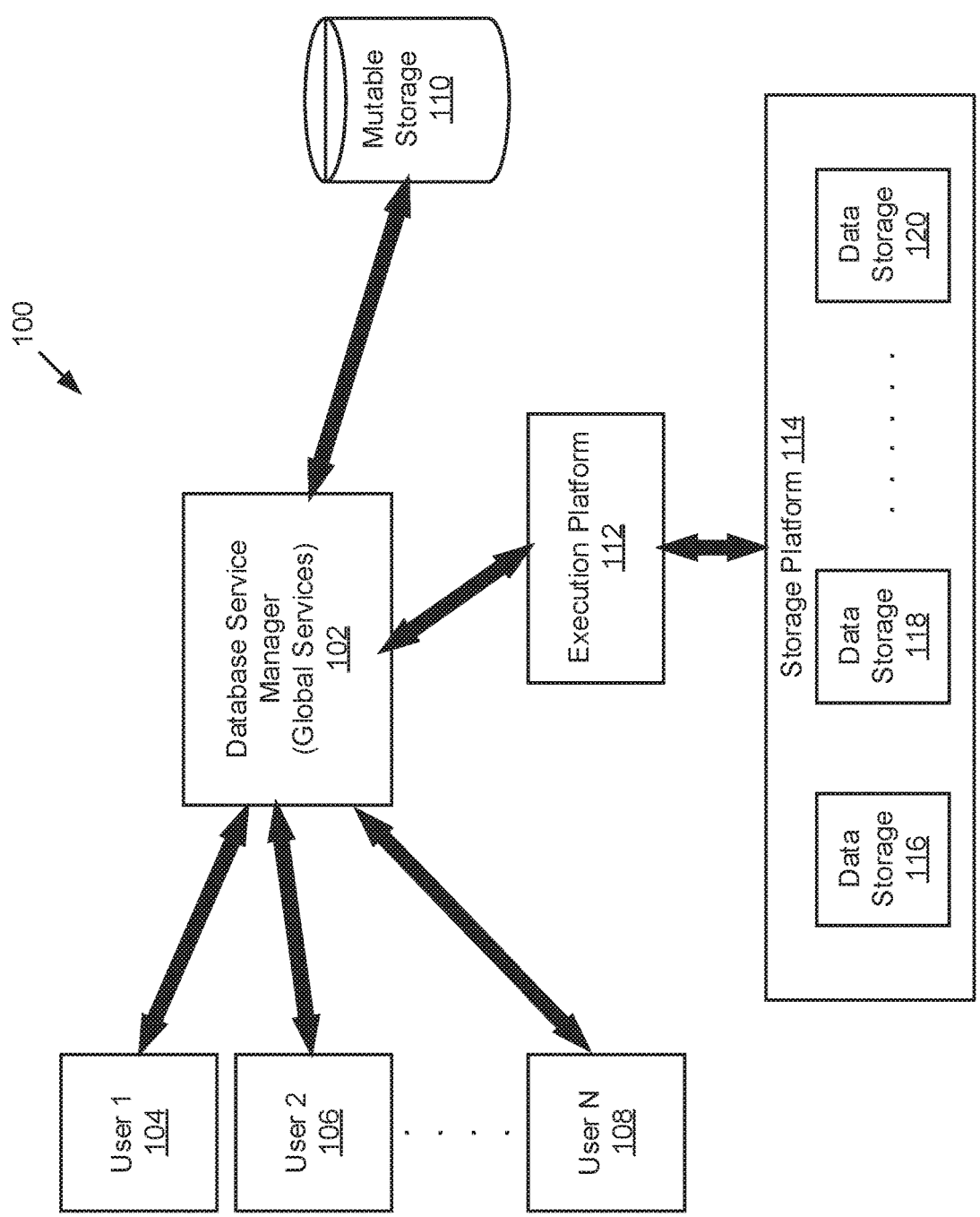
FIG. 1 is a block diagram illustrating a processing platform for a database system according to an example embodiment of the systems and methods described herein.

Databases are widely used for data storage and access in computing applications. Databases may include one or more tables that include or reference data that can be read, modified, or deleted using queries. Querying very large databases and/or tables might require scanning large amounts of data. Reducing the amount of data scanned is one of the main challenges of data organization and processing.

A join is an operation in query processing that determines rows in two input streams that "match" with respect to some of their attributes. In an embodiment, those attributes are referred to as join keys. Join operations are typically very time-consuming operations during query execution. A known embodiment of a join operation includes a SQL join clause for combining columns from one or more tables in a relational database. The join clause is a means for combining columns from one or more tables by using values common to each of the one or more tables.

A hash join is an example of a join algorithm that may be used in the implementation of a relationship database management system. Various forms of hash joins are commonly used in database systems to compute the result of a join. Hash joins build one or more multiple hash tables with rows of one of the inputs (typically the smaller input) referred to as the "build side" input. The rows are probed from the other input (typically the larger input) referred to as the "probe side" input and into the hash tables. In massively parallel database systems with N servers, two distribution strategies are often distinguished: broadcast joins and hash-hash joins (hash-hash-joins are also commonly referred to as shuffle joins).

A broadcast join is an example of a join algorithm where a single side of the data to be joined is materialized and sent to a plurality of workers or servers. Broadcast joins are efficient when the build side input fits into a main memory of a single server. Broadcast joins distribute all rows of the build side to all N servers and then hash partition the probe side over the servers such that each server of the N servers receives only a fraction of the probe side input. Each of the N servers probes its partition into its copy of the hash table wherein its copy of the hash table includes all data from the build side input.

Hash-hash joins are often employed where the build side input does not fit into a main memory of a single server. Hash-hash joins are configured to hash-partition the build side input across all N servers and then hash-partition the probe side input with the same partitioning function. In a hash-hash join, each server of the N servers probes its fraction of the probe side input into its fraction of the build side. The partitioning function ensures that if a row from probe partition $PP_i$ has matches in the build side, those matches are in build partition $BP_i$. This leads to equal utilization of all N participating servers during the probe phase of the hash-hash join, if an only if the partitioning function partitions the probe input into N partitions of equal size. In particular, if one server receives a disproportionately large amount of probe side data, it will take much longer than the rest of the servers to process its share of the probe side. This can stall the rest of the query execution. This is often caused by a few frequently occurring join keys on the probe side wherein some rows on the build side will match many rows on the probe side. This is referred to as probe-side skew.

In light of the foregoing, Applicant has developed systems, methods, and devices for managing data skew in a join operation, and particularly for managing probe-side data skew in a relational database join operation. An embodiment of the disclosure relates to redirecting a portion of a join operation to one or more other servers or computing devices. In an embodiment, a server or computing device that has been tasked with a join operation detects data skew on the join operation in real-time during runtime of the join operation. The server determines a frequent or heavy hitter join key on a probe side of the join operation. The server identifies a frequent or heavy hitter build-side row that comprises an equivalent value to the frequent join key on the probe side of the join operation. The server then distributes the frequent build-side row (it should be appreciated this may include many thousands of rows, for example) to one or more other servers or computing devices. The one or more other servers or computing devices are configured to receive the frequent build-side rows and process the join operation for those frequent build-side rows. The final result of the join operation is then a combination of the processing done by the local host server and any other servers that received a portion of the join operation. In an embodiment, the join operation is processed by a plurality of servers such that the join operation may be efficiently and quickly processed without burdening a single server with the join operation.

An embodiment of the disclosure includes a method for managing data skew in a join operation. The method includes computing a hash value for a join operation and detecting data skew on a probe side of the join operation at a runtime of the join operation using a lightweight sketch data structure. The method includes identifying a frequent probe-side join key on the probe side of the join operation during a probe phase of the join operation. The method includes identifying a frequent build-side row having a build-side join key corresponding with the frequent probe-side join key. The frequent build-side row may comprise many rows having a certain join key on the build side, and/or the frequent build-side row may comprise many join partners on the probe side. The method includes asynchronously distributing the frequent build-side row to one or more remote servers.

In an embodiment of the disclosure, a method for managing data skew during a join operation is disclosed. The method includes computing a hash value for a join operation, and the hash value may comprise a hash table. The method includes selecting a rowset comprising a plurality of rows of the join operation and probing each of the plurality of rows of the rowset into a space saving algorithm using the hash value for the join operation. The method includes updating the space saving algorithm base on incoming data, wherein the incoming data includes probe side rowsets. The method includes, for each update to the space saving algorithm, identifying a frequency indicating how frequently a frequent probe-side join key is probed as a side-effect of the updating the space saving algorithm. The method includes determining if the frequency exceeds a predetermined threshold. The method includes identifying a frequent build-side row having a build-side join key corresponding with the frequent probe-side join key. The method includes, in response to the frequency exceeding the predetermined threshold, asynchronously distributing the frequent build-side row to the one or more remote servers.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Turning to FIG. 1, a block diagram is shown illustrating a processing platform 100 for providing database services, according to one embodiment. In one embodiment, the processing platform 100 may store and maintain database tables using incremental cluster maintenance, as discussed herein. The processing platform 100 includes a database service manager 102 that is accessible by multiple users 104, 106, and 108. The database service manager 102 may also be referred to herein as a resource manager or global services. In some implementations, database service manager 102 can support any number of users desiring access to data or services of the processing platform 100. Users 104-108 may include, for example, end users providing data storage and retrieval queries and requests, system administrators managing the systems and methods described herein, software applications that interact with a database, and other components/devices that interact with database service manager 102.

The database service manager 102 may provide various services and functions that support the operation of the systems and components within the processing platform 100. Database service manager 102 has access to stored metadata associated with the data stored throughout data processing platform 100. The database service manager 102 may use the metadata for optimizing user queries. In some embodiments, metadata includes a summary of data stored in remote data storage systems as well as data available from a local cache (e.g., a cache within one or more of the clusters of the execution platform 112). Additionally, metadata may include information regarding how data is organized in the remote data storage systems and the local caches. Metadata allows systems and services to determine whether a piece of data needs to be processed without loading or accessing the actual data from a storage device.

As part of the data processing platform 100, metadata may be collected when changes are made to the data using a data manipulation language (DML), which changes may be made by way of any DML statement. Examples of manipulating data may include, but are not limited to, selecting, updating, changing, merging, and inserting data into tables. Table data for a single table may be partitioned or clustered into various partitions. As part of the processing platform 100, files or partitions may be created, and the metadata may be collected on a per file, per partition, and/or a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file, partition, or column. In an implementation, the metadata may further include string length information and ranges of characters in strings.

Database service manager 102 is further in communication with an execution platform 112, which provides computing resources that execute various data storage and data retrieval operations. The execution platform 112 may include one or more compute clusters. The execution platform 112 is in communication with one or more data storage devices 116, 118, and 120 that are part of a storage platform 114. Although three data storage devices 116, 118, and 120 are shown in FIG. 1, the execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure, or any other manner of distributed storage system. Data storage devices 116, 118, and 120 may include hard disk drives (HDDs), solid state drives (SSDs), storage clusters, or any other data storage technology. Additionally, the storage platform 114 may include a distributed file system (such as Hadoop Distributed File Systems (HDFS)), object storage systems, and the like.

In some embodiments, the communication links between database service manager 102 and users 104-108, mutable storage 110 for information about metadata files (i.e., metadata file metadata), and execution platform 112 are implemented via one or more data communication networks and may be assigned various tasks such that user requests can be optimized. Similarly, the communication links between execution platform 112 and data storage devices 116-120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 102, mutable storage 110, execution platform 112, and storage platform 114 are shown in FIG. 1 as individual components. However, each of database service manager 102, mutable storage 110, execution platform 112, and storage platform 114 may be implemented as a distributed system (e.g., distributed across multiple systems/platforms at multiple geographic locations) or may be combined into one or more systems. Additionally, each of the database service manager 102, mutable storage 110, the execution platform 112, and the storage platform 114 may be scaled up or down (independently of one another) depending on changes to the requests received from users 104-108 and the changing needs of the data processing platform 100. Thus, in the described embodiments, the data processing platform 100 is dynamic and supports regular changes to meet the current data processing needs.

In an embodiment of the disclosure, a local component, such as the execution platform 112 that may be distributed across a plurality of servers, handles data skew during a join operation. In such an embodiment, partitioning of data for handling data skew is not implemented or computed by the database service manager 102 but is instead computed on one or more servers such as the execution platform 112. In an embodiment of the disclosure, the determination of data skew and of frequent probe-side join keys is made locally on an execution platform 112 where a join operation is performed. In such an embodiment, the execution platform 112 may asynchronously distribute the frequent probe-side join keys to one or more other remote servers that may include one or more remote execution platforms 112.

Figure 2:
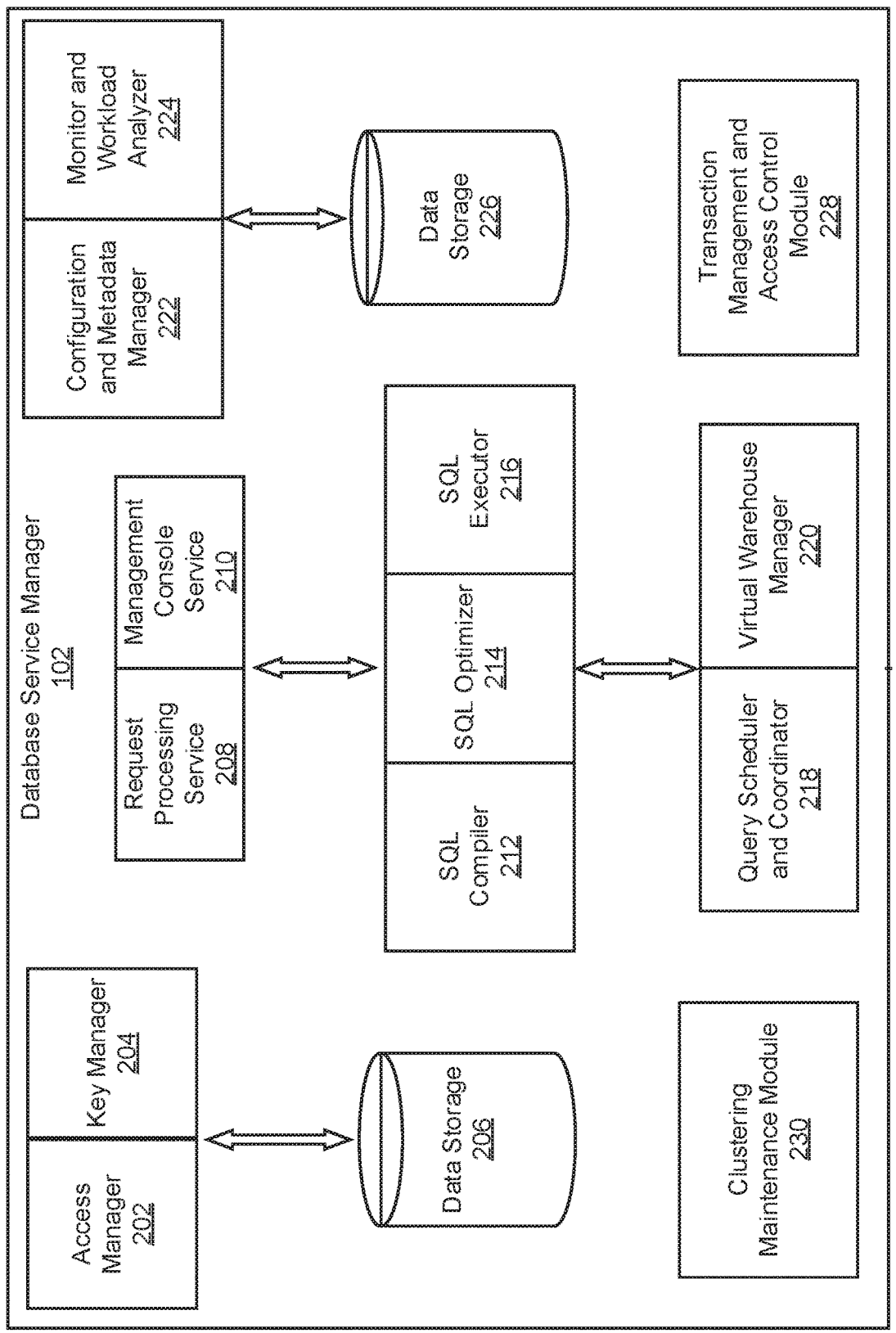
FIG. 2 is a block diagram illustrating components of a database service manager, according to an example embodiment of the systems and methods described herein.

FIG. 2 illustrates a block diagram depicting components of database service manager 102, according to one embodiment. The database service manager 102 includes an access manager 202 and a key manager 204 coupled to a data storage device 206. The access manager 202 handles authentication and authorization tasks for the systems described herein. The key manager 204 manages storage and authentication of keys used during authentication and authorization tasks. A request processing service 208 manages received data storage requests and data retrieval requests. A management console service 210 supports access to various systems and processes by administrators and other system managers.

The database service manager 102 also includes an SQL compiler 212, an SQL optimizer 214 and an SQL executor 216. SQL compiler 212 parses SQL queries and generates the execution code for the queries. SQL optimizer 214 determines the best method to execute queries based on the data that needs to be processed. SQL executor 216 executes the query code for queries received by database service manager 102. For example, the SQL optimizer may prune out rows or partitions of a table that do not need to be processed in the query because it is known, based on metadata, that they do not satisfy a predicate of the query. A query scheduler and coordinator 218 sends received queries to the appropriate services or systems for compilation, optimization, and dispatch to an execution platform 212. A virtual warehouse manager 220 manages the operation of multiple virtual warehouses.

Additionally, the database service manager 102 includes a configuration and metadata manager 222, which manages the information related to the data stored in the remote data storage devices and in the local caches. A monitor and workload analyzer 224 oversees the processes performed by the database service manager 102 and manages the distribution of tasks (e.g., workload) across the virtual warehouses and execution nodes in the execution platform 112. Configuration and metadata manager 222 and monitor and workload analyzer 224 are coupled to a data storage device 226.

The database service manager 102 also includes a transaction management and access control module 228, which manages the various tasks and other activities associated with the processing of data storage requests and data access requests. For example, the transaction management and access control module 228 provides consistent and synchronized access to data by multiple users or systems. Since multiple users/systems may access the same data simultaneously, changes to the data may be synchronized to ensure that each user/system is working with the current version of the data. Transaction management and access control module 228 provides control of various data processing activities at a single, centralized location in database service manager 102.

The database service manager 102 includes a cluster maintenance module 230 that manages the clustering and ordering of partitions of a table. The cluster maintenance module 230 may partition each table in a database into one or more partitions or micro-partitions. The cluster maintenance module 230 may not require or achieve ideal clustering for the table data but may maintain "good enough" or approximate clustering. For example, ideal clustering on a specific attribute may result in each partition either having non-overlapping value ranges or having only a single value for the specific attribute. Because the cluster maintenance module 230 does not require perfect clustering, significant processing and memory resources may be conserved during data loading or DML command operations.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

FIG. 3 illustrates an example join operation 300. The join operation 300 results in result table 320 are constructed based on a join operation to the build side table 302 and the probe side table 310. The build side table 302 is smaller than the probe side table 310 as illustrated in FIG. 3. The build side table includes two attributes (columns) including bKey 304 and bVal 306. The probe side table 310 further includes two attributes pKey 312 and pVal 314. The result table 320 indicates the result of the join operation 300 wherein bKey 304 is equal to pKey 312. The join operation 300 pairs up every row from the build side table 302 with every row from the probe side table 310 and then eliminates those rows where the attribute bKey 304 does not match the attribute pKey 312. In a hash join, the smaller table (in this case, the build side table 302) will be called the "build side" and the larger table (in this case, the probe side table 310) will be called the "probe side." Applicant further notes that the order in which rows are depicted in any of the tables is not relevant. It should be appreciated that the systems and methods of the disclosure may be implemented where the build side table is not the smaller table and is instead the larger table. Such an implementation would not impact the ability to leverage the skew handling techniques as disclosed herein.

As an example as illustrated in FIG. 3, there is a bKey 304 value equal to "42" that is associated with the bVal 306 value "X." Additionally there is a pKey 312 value "42" that is associated with the pVal 314 value "d." As illustrated in the result table 320 where bKey is equal to pKey, the bKey 304 value of "42" is matched with the pKey 312 value of "42," returning bVal 306 and pVal 314 values of "X" and "d," respectively.

As illustrated in FIG. 3, where there is a build-side key value (bKey 304) in the build side table 302 that is not represented as a probe-side key value (pKey 312) in the probe side table 310, any rows including that value do not appear in the result table 320. Similarly, where there is a probe-side key value (pKey 312) in the probe side table 310 that is not represented as a build-side key value (bKey 304) in the build side table 302, any row including that value is not included in the result table 320. An example of such a row in the build side table 302 is [512, W] because the "512" key is not represented in the probe side table 310. Examples of such rows in the probe side table 310 include [2,a] and [2003,f] because the "2" key and the "2003" key are not represented in the build side table 302.

Figure 4:
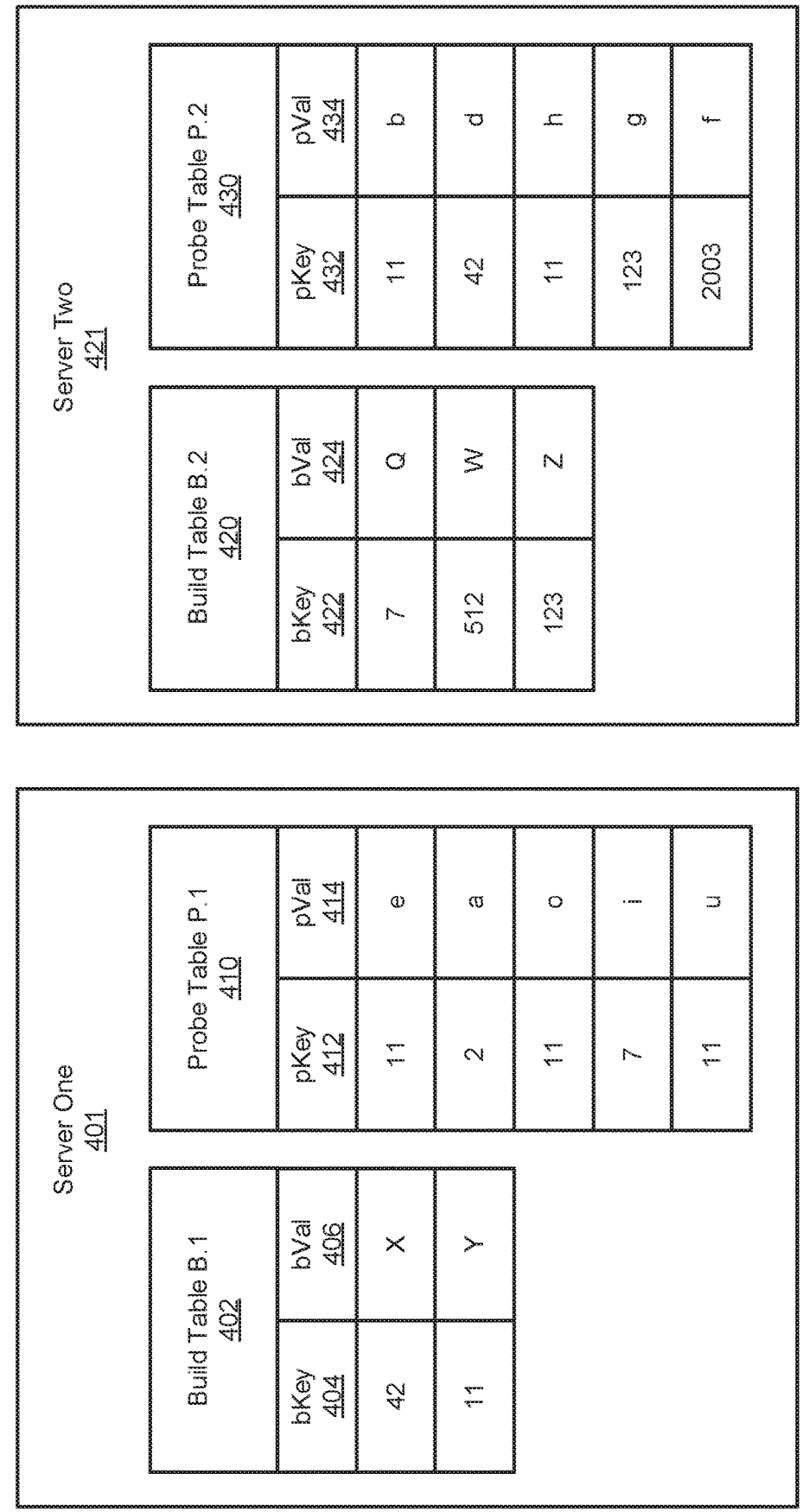
FIG. 4 is a schematic diagram illustrating an example join operation according to an embodiment of the disclosure.

FIGS. 4-7 illustrate data tables representing steps associated with a broadcast join operation. FIG. 4 illustrates an example set of tables for a join in a parallel database system, wherein FIG. 4 illustrates the tables before broadcast 400. In a parallel database system with multiple servers, data may be structured as illustrated in FIG. 4 before the join operation. It should be appreciated that any number of servers may be involved in a broadcast join operation, and the figures herein illustrate two servers for simplicity in illustrating the join operation.

Each server, including server one 401 and server two 421 include a build table and a probe table. Server one 401 includes a build table B.1 402 and a probe table P.1 410. Server two 421 includes a build table B.2 420 and a probe table P.2 430. The build table B.1 402 includes bKey 404 values and bVal 406 values, and the probe table P.1 410 includes pKey 412 values and pVal 414 values. The build table B.2 420 includes bKey 422 values and bVal 424 values, and the probe table P.2 430 includes pKey 432 values and pVal 434 values. An issue as illustrated in FIG. 4 is that server one 401 includes some rows (see e.g. [42,X]) that need to be joined with one or multiple rows of a probe table that reside on a different server (see e.g. [42,d] located on server two 421). To perform the join, the tables need to be repartitioned or redistributed in a way that allows an efficient computation of the join operation. Depending on the size of the build table (typically the smaller table), this is done via a broadcast join or a hash-hash join.

In an embodiment, FIG. 4 illustrates a broadcast join with the assumption that the combination of build table B.1 402 and build table B.2 420 is small enough to fit into memory of a single server. The build side is broadcasted to ensure that every server has all the rows of each of build table B.1 402 and build table B.2 420. Afterward, each server can probe the subset of a probe table (see probe table P.1 410 or probe table P.2 430) that it owns into the hash table to find matches.

Figure 5:
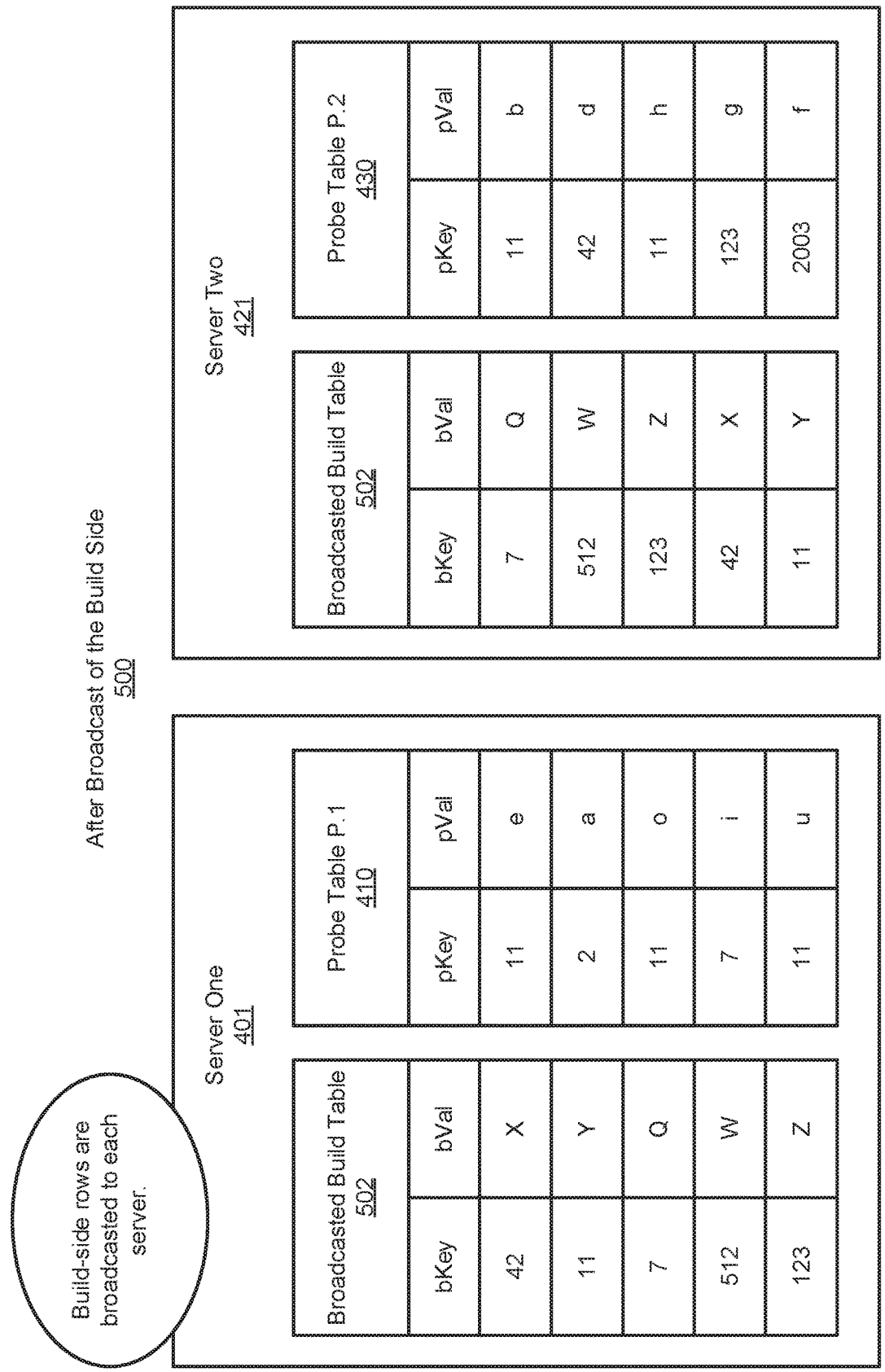
FIG. 5 is a schematic diagram illustrating an example join operation according to an embodiment of the disclosure.

FIG. 5 illustrates the same overall table values as illustrated in FIG. 4, but after broadcast of the build side 500 of the join operation. As illustrated in FIG. 5, after broadcast of the build side 500, each server (see server one 401 and server two 421) includes a complete copy of the broadcasted build table 502. The broadcasted build table 502 includes all values of the build side of the join operation, including values stored in build table B.1 402 and build table B.2 420. The probe side of the join operation (see probe table P.1 410 and probe table P.2 430 is not altered by the broadcasting of the build side 500 to each server.

FIG. 6 illustrates the same overall table values as illustrated in FIGS. 4-5, but after probing the probe side 600 of the join operation such that the final result of the join operation is illustrated. Server one 401 has generated a result R.1 602. Server two 421 has generated a result R.2 620. The union of result R.1 602 and result R.2 620 provides the final result. Each server (see server one 401 and server two 421) probes its subset of the probe side table (see probe table P.1 410 and probe table P.2 430) into the broadcasted build table 502. It should be appreciated that the broadcasted build table 502 may alternatively be referred to as the hash table. Thus, each server computes a part of the result and the combined results of all servers yields the correct overall result of the join.

FIG. 7 illustrates the final result 700 of the broadcast join operation computed based on the table values illustrated in FIGS. 4-6. The final result 700 includes bKey and bVal values originally found in the build side of the join operation. The final result 700 further includes pKey and pVal values originally found in the probe side of the join operation. The final result 700 is the union of result R.1 602 and result R.2 620 that were determined after probing the probe side of the join.

Figure 8:
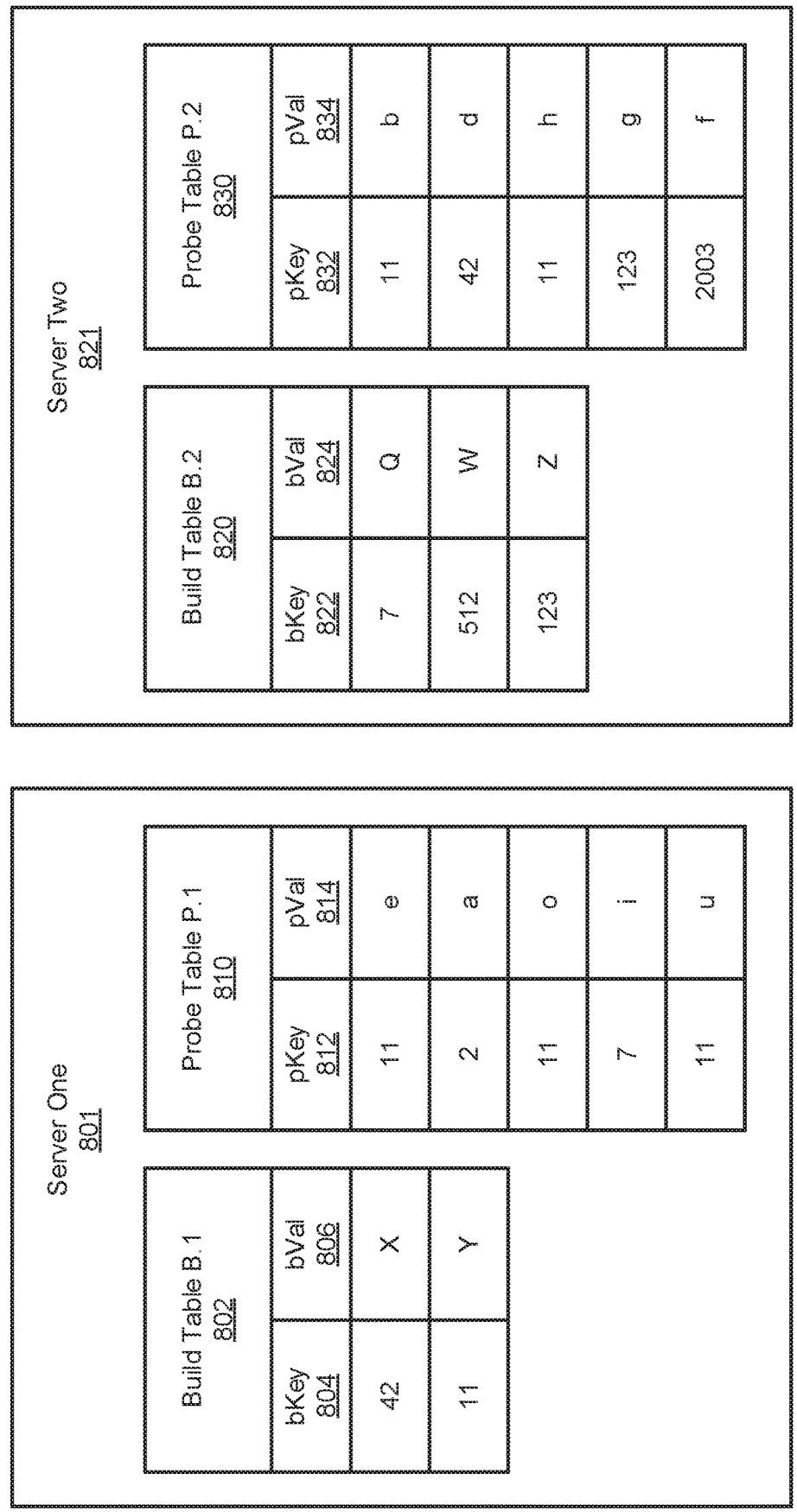
FIG. 8 is a schematic diagram illustrating an example join operation according to an embodiment of the disclosure.

FIGS. 8-10 illustrate data tables representing various steps of a hash-hash join operation. Applicant notes that FIGS. 8-10 include the same overall table values as illustrated in FIGS. 4-7 for simplicity in illustrating differences between a broadcast join and a hash-hash join. A hash-hash join is commonly implemented where the totality of build side comprises too much data to fit into a main memory of a single server. Both the build side data and the probe side data are hash-partitioned or redistributed to break up the total work into equal parts. For simplicity, FIGS. 8-10 illustrate a simple hash-partitioning function that will send each row where the join key is an even number to server one 801 and send each row where the join key is an odd number to server two 821. During a build phase of the join, each server will hash-partition every row of the build side (see build table B.1 802 and build table B.2 820). The probe side is then redistributed according to the same hash function. Each server can thus compute its part of the result locally.

FIG. 8 illustrates data tables on server one 801 and server two 821 before hash partitioning 800. Thus, FIG. 8 may represent the original data stored on one or more remote servers before a join operation is commenced. It should be appreciated that any number of servers may be involved in a hash-hash join, and the figures herein illustrate two servers for simplicity. Server one 801 includes a build table B.1 802 having bKey 804 values and bVal 806 values. Server one 801 further includes a probe table P.1 810 having pKey 812 and pVal 814 values. Server two 821 includes a build table B.2 820 having bKey 822 values and bVal 824 values. Server two 821 further includes a probe table P.2 830 having pKey 832 values and pVal 834 values.

The key values (see bKey 804, pKey 812, bKey 822, and pKey 832) constitute join keys. The join keys indicate how a match may be made between data stored in a build side of the join and data stored in a probe side of the join. That is, the final result of the join operation mandates that the bKey values match the pKey values. Where a build-side join key corresponds with, i.e. matches, a probe-side join key, the build-side row and the probe-side row may be joined.

FIG. 9 illustrates the same overall table values as in FIG. 8 after hash partitioning of the build side 900. FIG. 9 illustrates the result of the build phase of the join operation. During the build phase of the join operation, each server hash-partitions each row of the build side (see build table B.1 802 and build table B.2 820) to generate new partitioned build tables (see partitioned build table B.1 902 and partitioned build table B.2 920). The probe side tables remain the same (see probe table P.1 810 and probe table P.2 830). Server one 801 includes partitioned build table B.1 902 and probe table P.1 810. Server two 821 includes partitioned build table B.2 920 and probe table P.2 830.

For simplicity, a simple hash-partitioning function is used in an embodiment as illustrated in FIG. 9 such that each build-side row having an even-numbered join key (see bKey 804 and bKey 822) is sent to server one 801 and each build-side row having an odd-numbered join key (see bKey 804 and bKey 822) is sent to server two 821. During the build phase of the join operation, each server will hash-partition every row of the build side. For example, server one 801 will keep row [42,X] of build table B.1 802 because the join key (42) is an even number. Server one 801 will send row [11,Y] to server two 821 because the join key (11) is an odd number. Server two 821 will send row [512,Z] to server one 801 because the join key (512) is an even number. Server two will keep rows [7,Q] and [123,Z] because the join keys (7 and 123) are odd numbers.

FIG. 10 illustrates the same overall table values as in FIGS. 8-9 after hash partitioning of the probe side 1000. The probe side (see probe table P.1 810 and probe table P.2 830) is redistributed according to the same hash function used with respect to the build side as illustrated in FIG. 9. That is, probe-side rows having an even-numbered join key are partitioned to server one 801 and probe-side rows having an odd-numbered join key are partitioned to server two 821. As illustrated in FIG. 10, the partitioned probe table P.1 1010 on server one 801 includes rows having an even-numbered join key including [2,a] and [42,d]. The partitioned probe table P.2 1030 on server two 821 includes rows having an odd-numbered join key including [11,b], [11,h], [123,g], [2003, f], [11,e], [11,o], and [11,u]. As such, each server can compute its part of the join result locally.

In an embodiment, the results of the partitioned probe data (see partitioned probe table P.1 1010 and partitioned probe table P.2 1030) are not stored on the respective servers after the probe side data has been partitioned. Rather, the partitioned probe data is streamed through a server such that each probe data row either remains on the current server or is transmitted to a remote server. Either way, the probe data row is immediately probed into the hash table (i.e. the respective partitioned build table) and matched with one or more rows of the build side. The resulting rows are transmitted to the next operator of the query execution logic.

FIG. 11 illustrates the partitioned result 1100 after probing the partitioned probe data (see partitioned probe table P.1

1010 and partitioned probe table P.2 1030) into the partitioned build data (see partitioned build table B.1 902 and partitioned build table B.2 920). Server one 801 returns result R.1 1102 and server two 821 returns result R.2 1104. The final result of the hash-hash join operation includes the union of result R.1 1102 and result R.2 1104. As such, the final result of the hash-hash join operation is computed locally by one or more servers, and the individual results of each of the individual servers is combined to generate the final result.

As illustrated in FIG. 11, the partitioned result 1100 includes a great deal of data skew indicating by server two 821 having a great deal more data than server one 801. The result R.2 1104 includes many more rows of data than the result R.1 1102. This is caused by a presence of more rows having an odd-numbered join key than rows having an even-numbered join key. In an embodiment as illustrated in FIG. 11, server two 821 would take much longer to finish its part of the join operation work. Applicant presents methods, systems, and devices for detecting probe-side data skew as illustrated in FIG. 11. The methods, systems, and devices as disclosed by applicant are configured to redistribute a frequent build-side row (see e.g. rows having join key "11") to one or more remote servers such that all rows having the frequent key (in this case "11") may be probed on any of the one or more remote servers.

Figure 12:
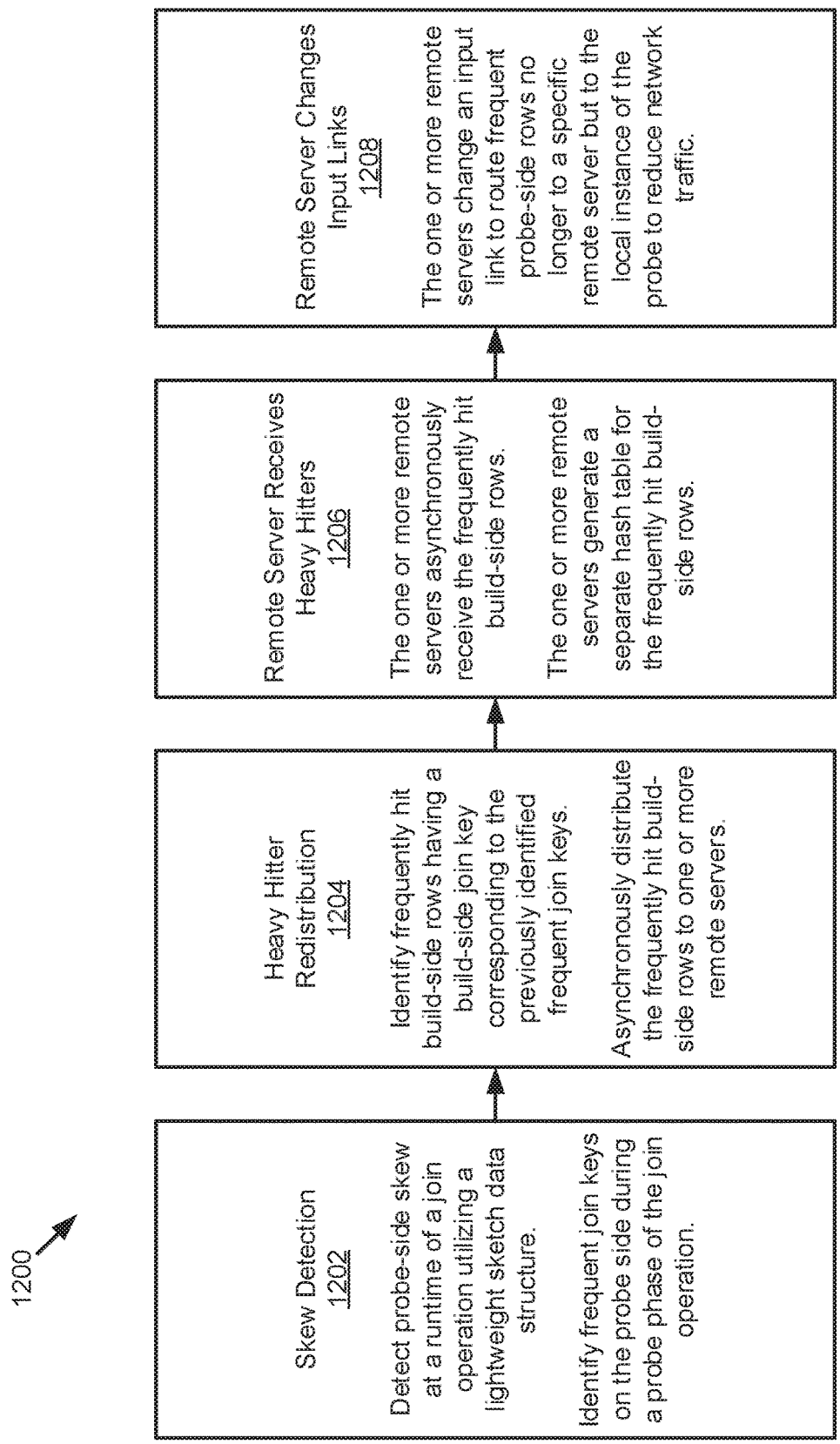
FIG. 12 is a schematic flow chart diagram of an example process flow for detecting and managing probe-side skew during a join operation, according to an embodiment of the disclosure.

FIG. 12 illustrates a process flow 1200 of a system and method for detecting and managing probe-side skew during a join operation, according to one embodiment. The process flow 1200 includes skew detection at 1202. The skew detection at 1202 includes detecting probe-side skew at a runtime of a join operation utilizing a lightweight sketch data structure. The skew detection at 1202 further includes identifying frequent or heavy hitter join keys on the probe side during a probe phase of the join operation. The process flow 1200 includes heavy hitter redistribution at 1204. Heavy hitter redistribution at 1204 includes identifying frequently hit build-side rows having a build-side join key corresponding to the previously identified frequent (i.e. heavy hitter) join keys. The heavy hitter redistribution at 1204 further includes asynchronously distributing the frequently hit build-side rows to one or more remote servers. The process flow includes remote servers receiving heavy hitters at 1206. The remote servers receiving heavy hitters at 1206 includes the one or more remote servers asynchronously receiving the frequently hit build-side rows and generating a separate hash table for the frequently hit build-side rows. The process flow 1200 includes remote servers changing input links at 1208. The remote servers changing input links at 1208 includes the one or more remote servers changing an input link to route frequent probe-side rows no longer to a specific remote server but to the local instance of the probe to reduce network traffic.

It should be appreciated that a heavy hitter includes a frequently seen or frequently used join key or row. In an embodiment, a heavy hitter includes a build-side row that is frequently hit by the probe side of the join operation. In an embodiment, a heavy hitter includes a probe-side join key that does not find a build-side row. In an embodiment, a heavy hitter includes a probe-side join key that is frequently probed by the build side.

The process flow 1200 can enable a local computing device, such as a server or an execution platform 112, to outsource one or more frequent build-side rows to one or more other servers. The one or more other servers may be referred to as "remote" servers and this may denote that the one or more other servers is simply different from the local server that is conducting the join operation. A remote server need not be physically remote and may be located in the same geographical region as the local server. In an embodiment of the disclosure, a plurality of computing devices or servers are in communication with one another and the plurality of computing devices or servers share the computing load of processing a join operation. In such an embodiment, a local server asynchronously distributes frequently hit build-side rows to one or more remote servers, and the one or more remote servers are configured to asynchronously receive the frequently hit build-side rows and generate a separate hash table for the frequently hit build-side rows. In an embodiment of the disclosure the plurality of computing devices or servers and configured to efficiently process a join operation such that frequently hit build-side rows are distributed amongst the plurality of computing devices or servers.

Figure 13:
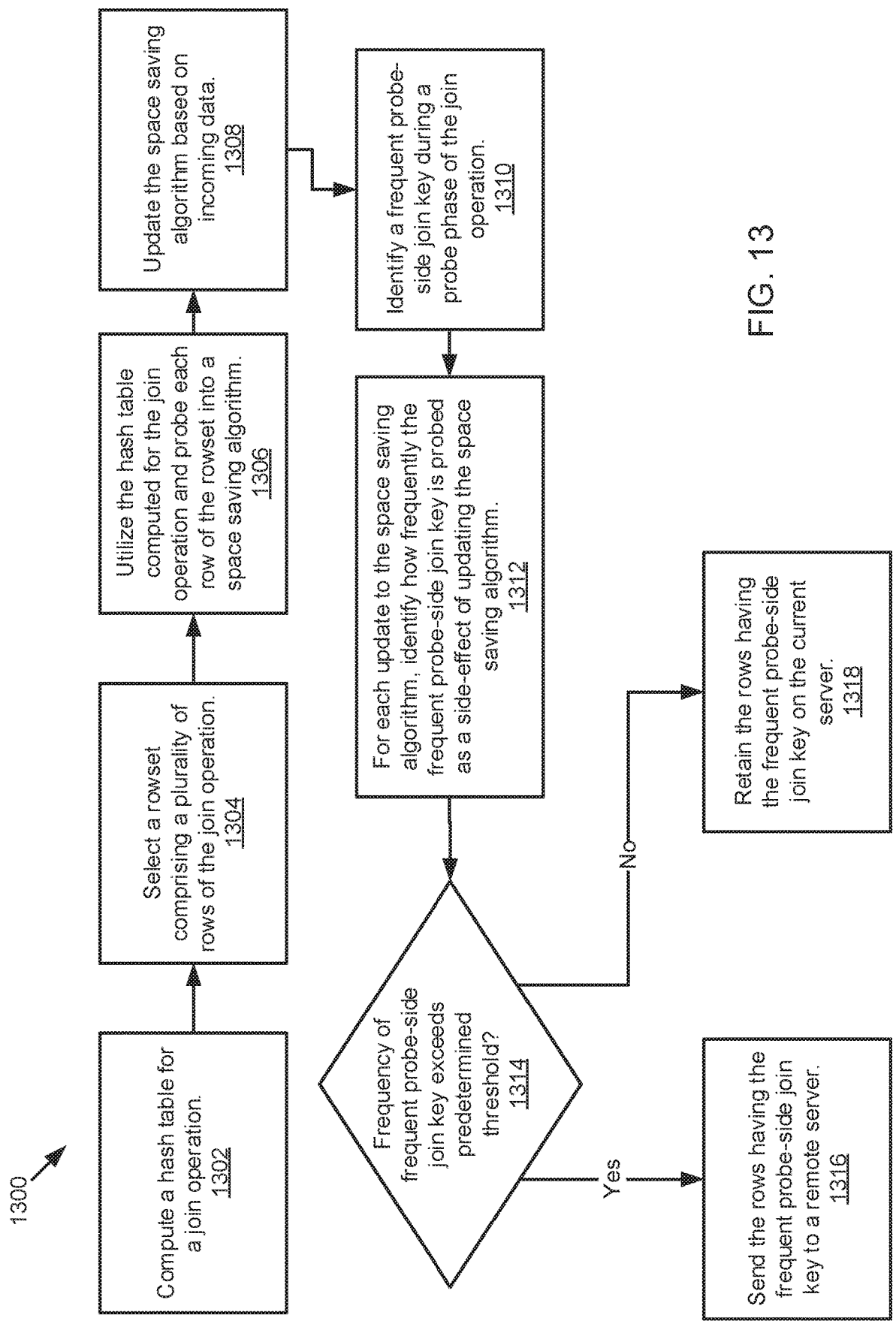
FIG. 13 is a schematic flow chart diagram of an example process flow for detecting skew during a join operation, according to an embodiment of the disclosure.

FIG. 13 illustrates a process flow 1300 of a process for skew detection (see e.g. 1202 at FIG. 12), according to one embodiment. The process flow 1300 includes computing a hash table for a join operation at 1302 and selecting a rowset comprising a plurality of rows of the join operation at 1304. The process flow 1300 includes utilizing the hash table computed for the join operation and probing each row of the rowset into a space saving algorithm at 1306. The process flow 1300 includes updating the space saving algorithm based on incoming data, wherein the incoming data includes probe side rowsets at 1308. The process flow 1300 includes identifying a frequent probe-side join key on a probe side of the join operating during a probe phase of the join operation at 1310. The process flow 1300 includes, for each update to the space saving algorithm, identifying how frequently the frequent probe-side join key is probed as a side-effect of updating the space saving algorithm at 1312. The process flow 1300 includes the determination of whether the frequency of the frequent probe-side join keys exceeds a predetermined threshold at 1314. If the determination at 1314 is yes, then the process flow 1300 includes sending rows associated with the frequent probe-side join key to a remote server at 1316. If the determination at 1314 is no, then the process flow 1300 includes retaining the rows associated with the frequent probe-side join key on the current server at 1318.

Figure 14:
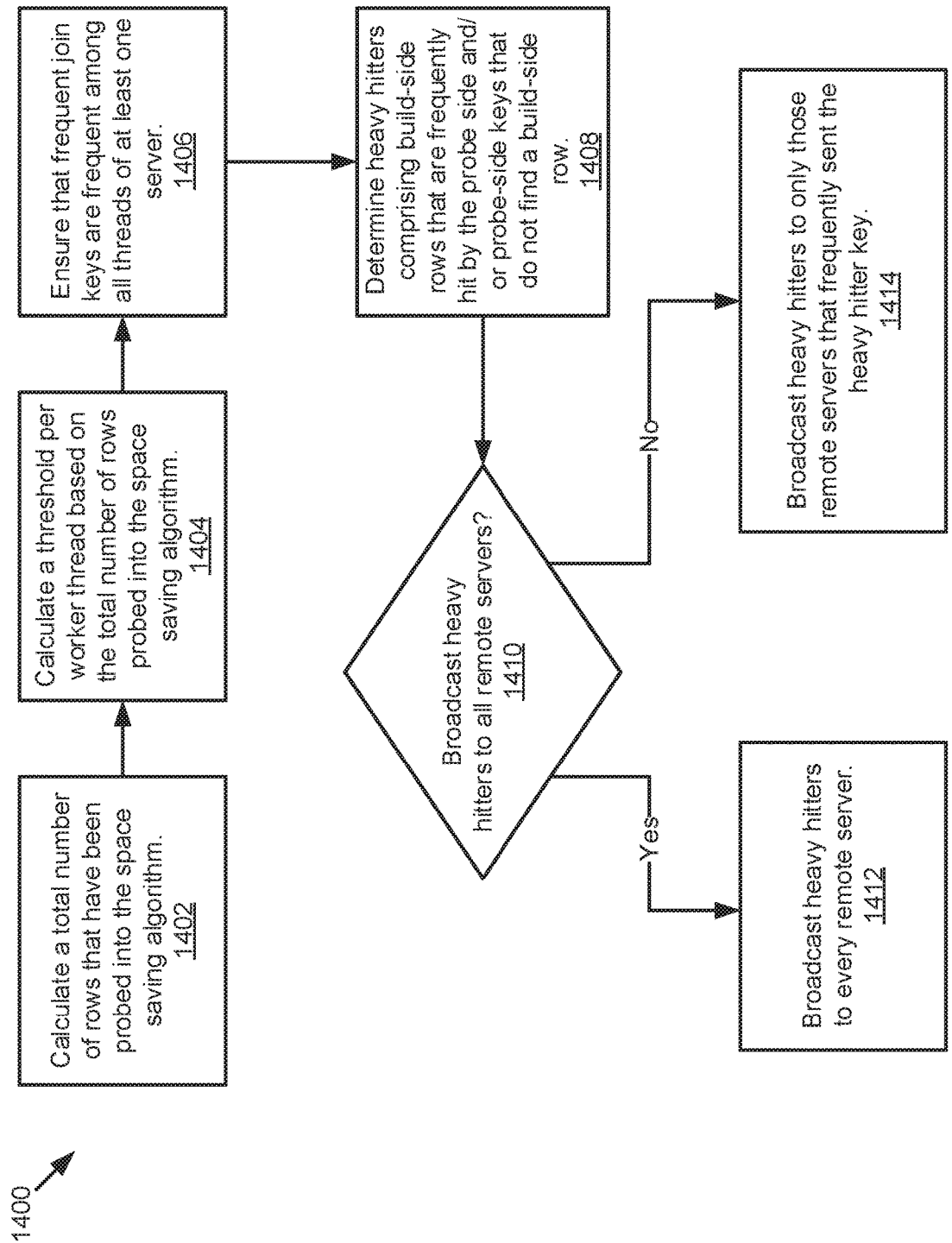
FIG. 14 is a schematic flow chart diagram of a process flow for heavy hitter redistribution, according to an embodiment of the disclosure.

FIG. 14 illustrates a process flow 1400 of a process for heavy hitter redistribution (see e.g. 1204 at FIG. 12). The process flow 1400 includes recording a total number of rows inserted into the space saving algorithm at 1402. The process flow 1400 includes calculating a threshold per worker based on the total number of rows inserted into the space saving algorithm at 1404 and ensuring that frequent join keys are frequent among all threads of at least one server at 1406. The process flow 1400 includes determining heavy hitters comprising one or more of frequent build-side rows that are frequently hit by the probe side and frequent probe-side keys that do not find a build side row at 1408. The process flow 1400 includes the determination of whether the heavy hitters should be broadcast to all remote servers at 1410. This may be determined by a client request, a threshold metric to be satisfied, and so forth. If the determination at 1410 is yes, then the process flow 1400 includes broadcasting heavy hitters to every remote server at 1412. If the determination at 1410 is no, then the process flow 1400 includes broadcasting heavy hitters to only those remote servers that frequently sent the heavy hitter key at 1414.

The space saving algorithm includes, for example, the space saving algorithm and space saving sketch as disclosed in: Metwally, Ahmed, Divyakant Agrawal, and Amr El Abbadi. Efficient Computation of Frequent and Top-k Elements in Data Streams. Department of Computer Science University of California, Santa Barbara, which is disclosed herein by reference in its entirety. The space saving algorithm provides an integrated approach for solving problems of finding frequent elements in a data stream such as a join operation. The space saving algorithm provides an associated stream summary data structure. The underlying concept of the space saving algorithm is to maintain partial information of interest, i.e. only certain elements are monitored. Counters are updated in a way that accurately estimates frequencies of significant elements, and a lightweight sketch data structure is utilized that keeps the elements sorted by their estimated frequencies.

The space saving algorithm includes observing an element that is monitored and incrementing the element's counter. If an element is not monitored, the element is given the least estimated hits and the counter is calculated as the last estimated hits plus one. For each monitored element, the space saving algorithm keeps track of its over-estimation resulting from the initialization of its counter when it was inserted into the list. The space saving algorithm makes use of the skewed property of the data in that the space saving algorithm expects a minority of the elements, i.e. the more frequent elements, to receive the majority of hits. Frequent elements will reside in the counters of bigger values and will not be distorted by the ineffective hits of the infrequent elements, and thus, will not be replaced out of the monitored counters. The infrequent elements will reside on smaller counters, whose values will grow slower than those of the larger counters. If skew remains but the popular elements change overtime, the space saving algorithm will adapt automatically. The elements that are growing more popular will gradually be pushed to the top of the list as they receive more hits. If one of the previously popular elements loses its popularity, it will receive less hits. Thus, the relative position of the previously popular element will decline as other counters are incremented, and the previously popular element might eventually be dropped from the list.

In the space saving algorithm, even if the data is not skewed, the errors in the counters will be inversely proportional to the number of counters. Maintaining only a moderate number of counters will reduce error because the more counters that are maintained, the less it is probable to replace elements, and the smaller the over-estimation errors in a counter's values. In an embodiment the space saving algorithm is implemented in a data structure that increments counters without violating the order of the counters and ensures constant time retrieval.

Figure 15:
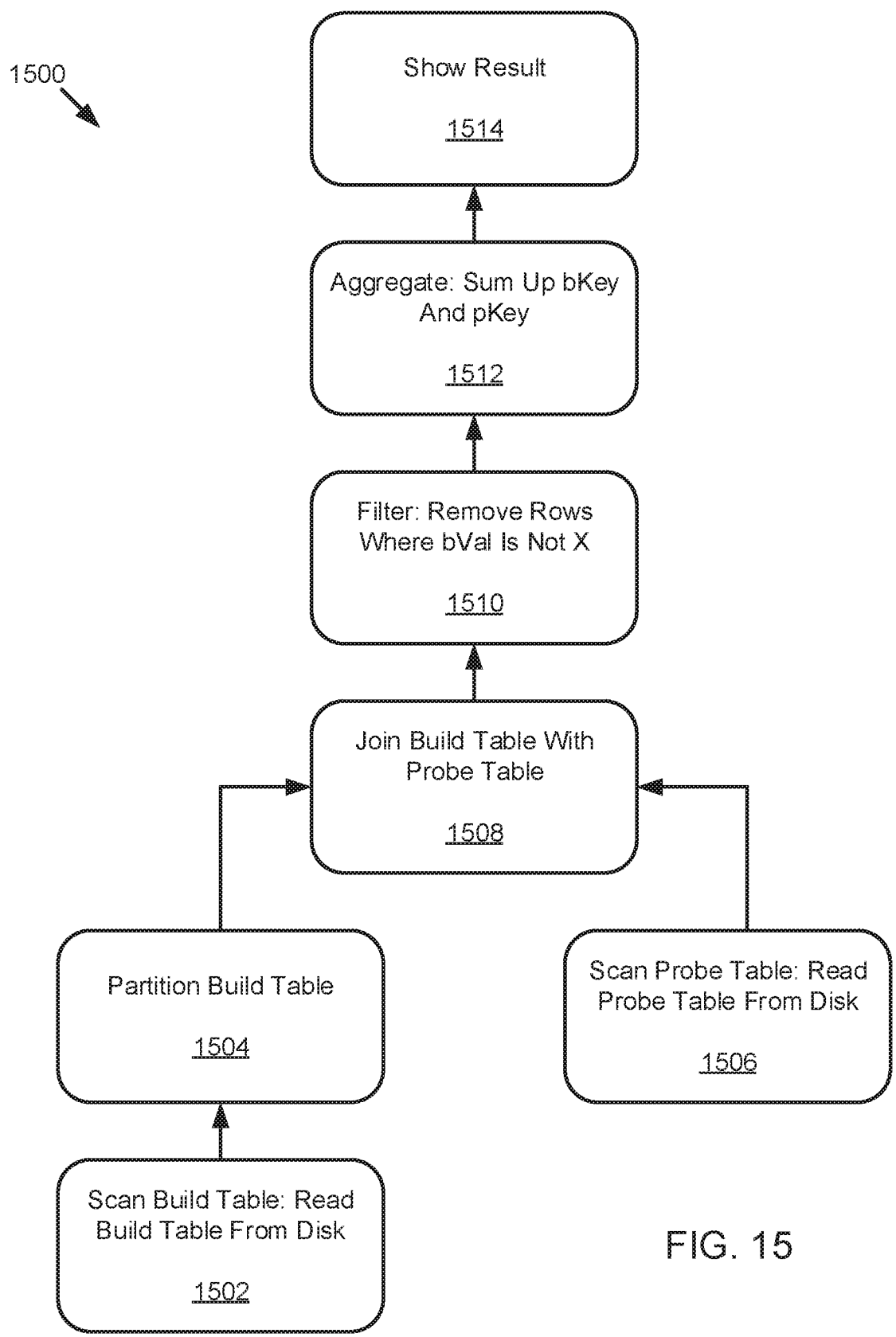
FIG. 15 illustrates a schematic block diagram of a process flow for query processing, according to an embodiment of the disclosure.

FIG. 15 illustrates a schematic block diagram of a process flow 1500 for query processing. The process flow 1500 depicts an execution plan comprising multiple operators or building blocks. The process flow 1500 computes a hash join between a build-side table and a probe-side table and then filters out some of the resulting rows and performs an aggregation over all of the build-side keys and the probe-side keys as a result of the join operation.

The process flow 1500 includes scanning a build table by reading the build table from a disk at 1502 and partitioning the build table at 1504. The process flow 1500 includes scanning a probe table by reading the probe table from a disk at 1506. The process flow 1500 includes joining the build table with the probe table at 1508. The process flow 1500 includes filtering rows where a build-side value is not equal to a set key at 1510. The process flow 1500 includes aggregating the sum of all build-side keys and probe-side keys at 1512. The process flow 1500 includes providing the result at 1514.

Figure 16:
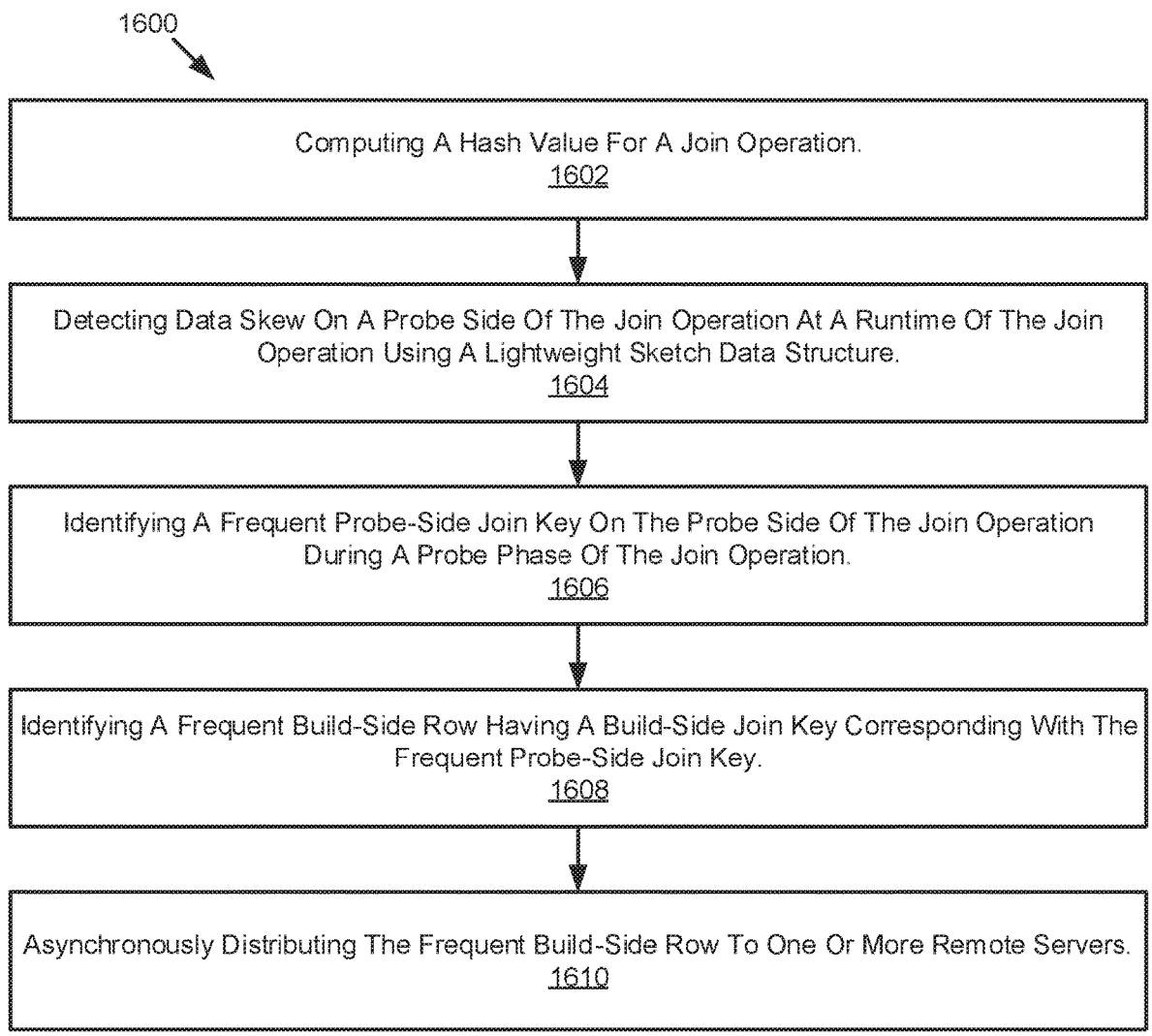
FIG. 16 illustrates a schematic flow chart diagram of a method for managing probe-side skew during a join operation, according to an embodiment of the disclosure.

FIG. 16 illustrates a schematic flow chart diagram of a method 1600 for managing probe-side skew during a join operation of a database. The method 1600 begins and a server computes a hash value for a join operation at 1602. The server detects data skew on a probe side of the join operation at a runtime of the join operation using a lightweight sketch data structure at 1604. The server identifies a frequent probe-side join key on the probe side of the join operation during a probe phase of the join operation at 1606. The server identifies a frequent build-side row having a build-side join key corresponding with the frequent probe-side join key at 1608. The server asynchronously distributes the frequent build-side row to one or more remote servers at 1610. It should be appreciated that the server may include any suitable computing platform, including the execution platform 112 discussed in FIG. 1.

Figure 17:
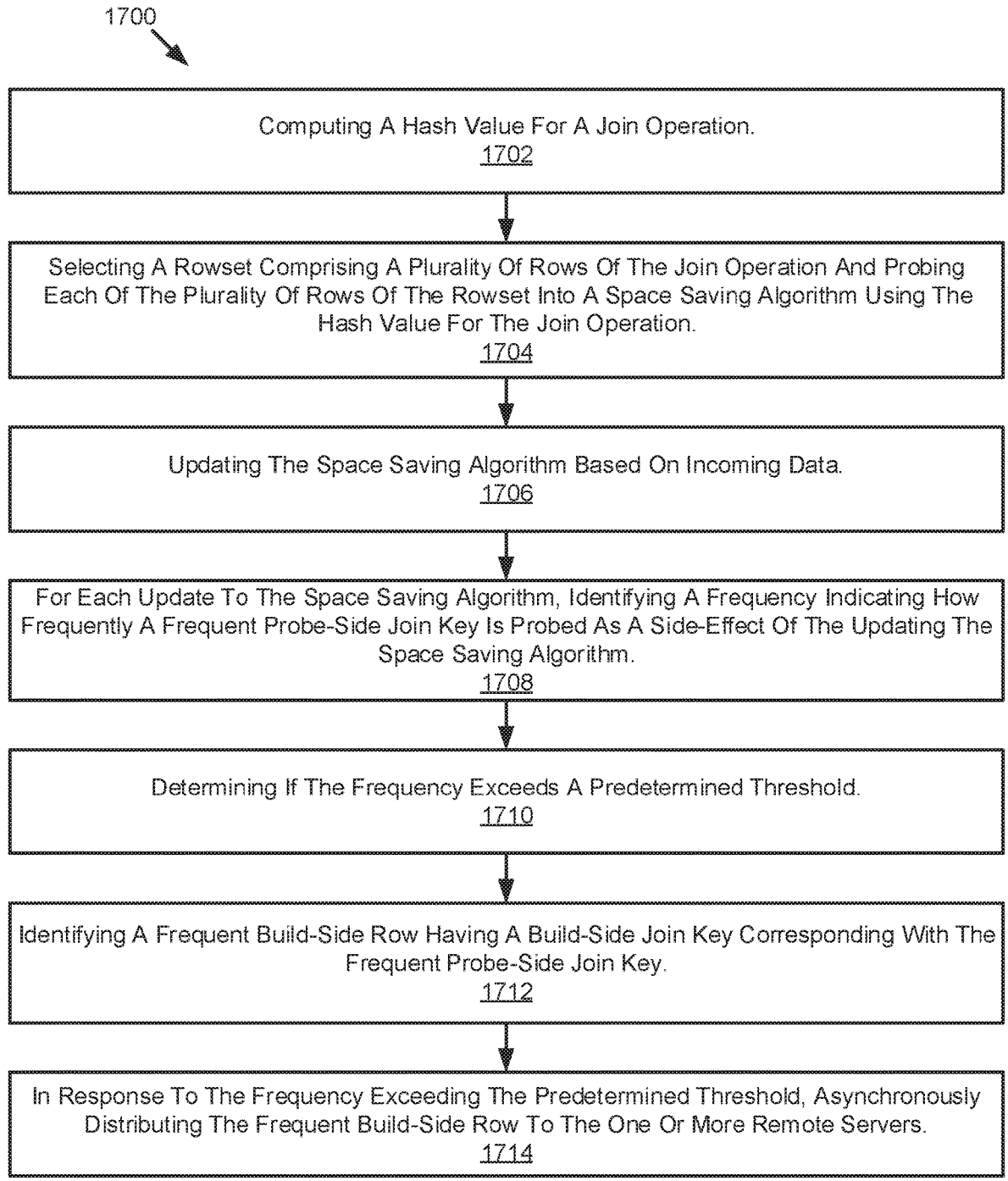
FIG. 17 illustrates a schematic flow chart diagram of a method for managing probe-side skew during a join operation, according to an embodiment of the disclosure.

FIG. 17 illustrates a schematic flow chart diagram of a method 1700 for handling probe-side skew during a join operation of a database. The method 1700 begins and a server computes a hash value for a join operation at 1702 wherein the hash value may comprise a hash table. The server selects a rowset comprising a plurality of rows of the join operation and probes each of the plurality of rows of the rowset into a space saving algorithm using the hash value for the join operation at 1704. The server updates the space saving algorithm based on incoming data at 1706. The server, for each update to the space saving algorithm, identifies a frequency indicating how frequently a frequent probe-side join key is probed as a side effect of the updating the space saving algorithm at 1708. The server determines if the frequency exceeds a predetermined threshold at 1710. The server identifies a frequent build-side row having a build-side join key corresponding with the frequent probe-side join key at 1712. The server, in response to the frequency exceeding the predetermined threshold, asynchronously distributes the frequent build-side row to the one or more remote servers at 1714. It should be appreciated that the server may include any suitable computing platform, including the execution platform 112 discussed in FIG. 1.

In an embodiment of the disclosure, systems, methods, and devices for detecting and managing data skew during a join operation are disclosed. As illustrated in FIGS. 8-11, a hash-hash join includes two phases. The hash-hash join includes a build phase wherein the hash tables are generated (the hash tables include build-side data). The hash-hash join includes a probe phase wherein probe-side data is probed into the hash table to find matching build-side rows for the probe-side rows based on the respective join keys.

In an embodiment, skew detection is conducted in a vectorized way wherein batches of rows are processed together. In an embodiment, a batch includes, for example, hundreds or thousands of rows that are be process together as a single rowset. In an embodiment a probe rowset is selected for detection of data skew. In an embodiment, a first rowset is not selected and then approximately every $n^{th}$ rowset is selected for detection of data skew. In an embodiment, the hash value computed for the join operation is reused to probe each row of the rowset into a space saving algorithm and data structure.

The space saving algorithm and data structure approximately maintains the N most frequent probe-side join keys. Due to the probabilistic nature of the space saving algorithm, the result might not be entirely accurate and may return a small error that increases in accuracy as the distribution of data becomes more skewed. In an embodiment, the space saving algorithm is not updated with every rowset. In an embodiment, the space saving algorithm is updated with a subset of incoming data, for example a small hash table of size N. In an embodiment, the hash value that was computed for the join operation is reused and is updated with the same subset of incoming data. In an embodiment after the space saving algorithm has been updated one or more times, the systems, methods, and devices of the disclosure will begin to identify frequent join keys as a side-effect of updating the space saving algorithm. In an embodiment, for each update, the frequency of the frequent join key is detected and if the number exceeds a threshold, the associated build-side row having the frequent join key is sent to one or more remote servers.

In an embodiment, for all workers threads of a server, the total number of rows inserted into the space saving algorithm is recorded. Based on the number of rows inserted into the space saving algorithm, a threshold per worker thread is computed that ensures that keys are frequent among all threads of at least one server if the row is classified as a "frequent" or heavy hitter. In an embodiment, rows comprising a frequent join key are redistributed to one or more remote servers. It should be appreciated that a "frequent" key or row (also referred to as a heavy hitter) may include either of a build-side row that is frequently hit by the probe side or a probe-side key that does not find a build-side row and is probed anyway because a bloom filter fails to remove it from the join operation. In an embodiment, rows comprising a frequent join key are broadcasted to every other remote server. In an embodiment, the rows comprising a frequent join key are broken down and distributed per server that sent the frequent join key. In an embodiment, if only a subset of remote servers frequently sends the join key, the rows comprising the frequent join key may be distributed only to that subset of remote servers.

In an embodiment, a link change is made. In an embodiment a link is a software component configured to connect two operators and send a rowset from a source operator to a destination operator. The source operator and the destination operator may be on the same server or on different servers. A link governs which row is sent to which instance of the next operator. A local link invokes the destination operator on the same server with the rowset. A broadcast link transmits each row in the rowset to every instance of the destination operator. A hash link computes a hash value of some of the attributes of the rowset and distributes the rows according to that hash value. In an embodiment for probe-side skew handling, a hash link also checks a small separate hash table that contains exceptions. If the hash link finds an exception for a hash value, it does not send the row to the instance associated with that hash value but instead to its local counterpart (i.e. the destination operator's instance on the same server). In an embodiment, changing a link includes adding an entry into the small hash table in the link.

In an embodiment of the disclosure, a system for managing data skew is disclosed. The system includes a means for computing a hash value for a join operation. The system includes a means for detecting data skew on a probe side of the join operation at a runtime of the join operation using a lightweight sketch data structure. The system includes a means for identifying a frequent probe-side join key on the probe side of the join operation during a probe phase of the join operation. The system includes a means for identifying a frequent build-side row having a build-side join key corresponding with the frequent probe-side join key. The system includes a means for asynchronously distributing the frequent build-side row to one or more remote servers.

It will be appreciated that the structures, materials, or acts disclosed herein are merely one example of, for example, a means for computing a hash value for a join operation, and it should be appreciated that any structure, material, or act for computing a hash value for a join operation which performs functions the same as, or equivalent to, those disclosed herein are intended to fall within the scope of a means for computing a hash value for a join operation, including those structures, materials, or acts for computing a hash value for a join operation which are presently known, or which may become available in the future. Anything which functions the same as, or equivalently to, a means for computing a hash value for a join operation falls within the scope of this element.

It will be appreciated that the structures, materials, or acts disclosed herein are merely one example of, for example, a means for detecting data skew on a probe side of the join operation at a runtime of the join operation using a lightweight sketch data structure, and it should be appreciated that any structure, material, or act for detecting data skew on a probe side of the join operation at a runtime of the join operation using a lightweight sketch data structure which performs functions the same as, or equivalent to, those disclosed herein are intended to fall within the scope of a means for detecting data skew on a probe side of the join operation at a runtime of the join operation using a lightweight sketch data structure, including those structures, materials, or acts for detecting data skew on a probe side of the join operation at a runtime of the join operation using a lightweight sketch data structure which are presently known, or which may become available in the future. Anything which functions the same as, or equivalently to means for detecting data skew on a probe side of the join operation at a runtime of the join operation using a lightweight sketch data structure falls within the scope of this element.

It will be appreciated that the structures, materials, or acts disclosed herein are merely one example of, for example, means for identifying a frequent probe-side join key on the probe side of the join operation during a probe phase of the join operation, and it should be appreciated that any structure, material, or act for identifying a frequent probe-side join key on the probe side of the join operation during a probe phase of the join operation which performs functions the same as, or equivalent to, those disclosed herein are intended to fall within the scope of a means for identifying a frequent probe-side join key on the probe side of the join operation during a probe phase of the join operation, including those structures, materials, or acts for detecting data skew on a probe side of the join operation at a runtime of the join operation using a lightweight sketch data structure which are presently known, or which may become available in the future. Anything which functions the same as, or equivalently to means for identifying a frequent probe-side join key on the probe side of the join operation during a probe phase of the join operation falls within the scope of this element.

Figure 18:
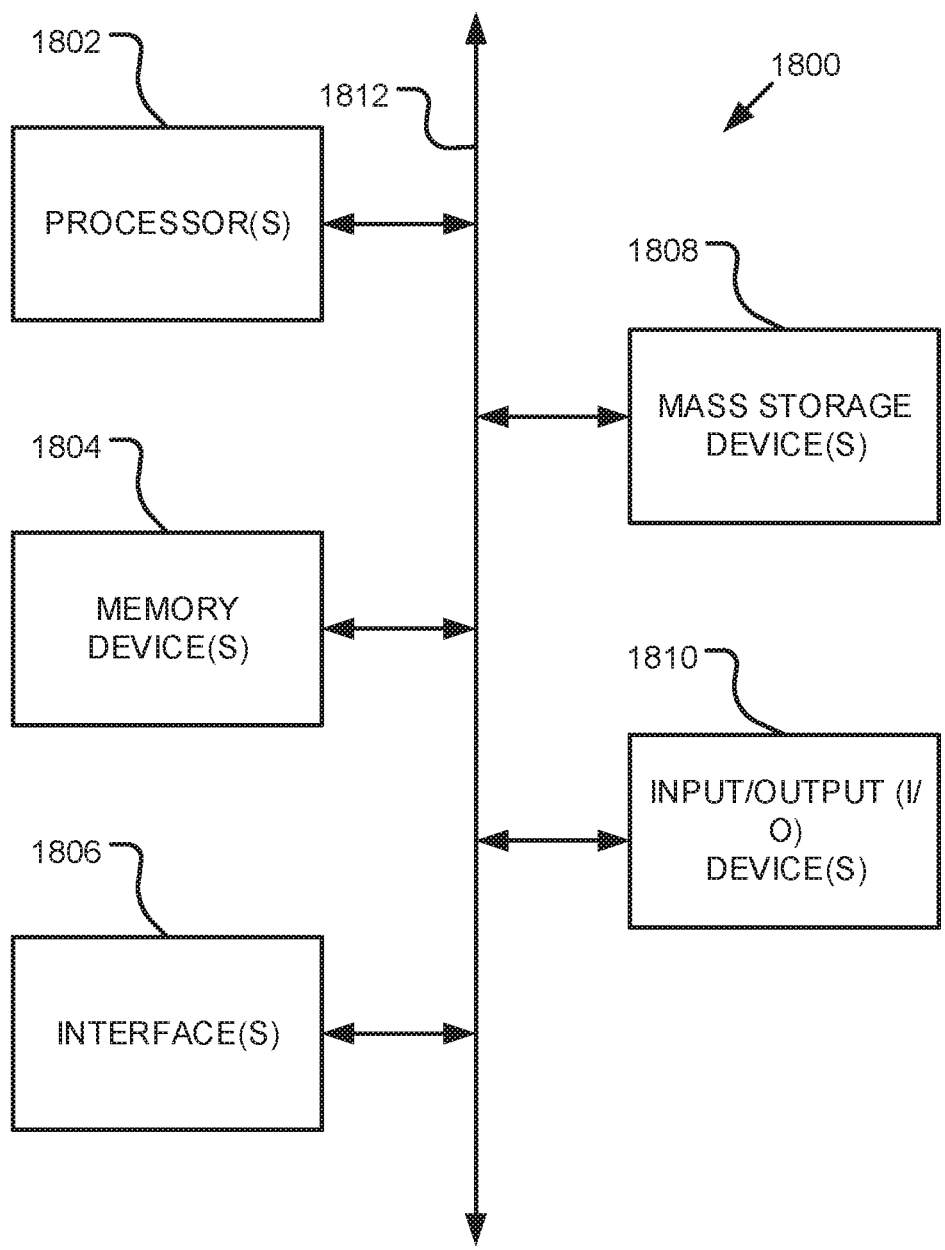
FIG. 18 is a schematic diagram of an example computing device, according to an embodiment of the disclosure.

FIG. 18 is a block diagram depicting an example computing device 1800. In some embodiments, computing device 1800 is used to implement one or more of the systems and components discussed herein. For example, the computing device 1800 may be used to implement one or more of the database service manager 102, components or modules configured to detecting and managing data skew during a join operation, and one or means for carrying out process steps for detecting and managing data skew during a join operation. Further, computing device 1800 may interact with any of the systems and components described herein. Accordingly, computing device 1800 may be used to perform various procedures and tasks, such as those discussed herein. Computing device 1800 can function as a server, a client or any other computing entity. Computing device 1800 can be any of a wide variety of computing devices, such as a desktop computer, a notebook computer, a server computer, a handheld computer, a tablet, and the like.

Computing device 1800 includes one or more processor(s) 1802, one or more memory device(s) 1804, one or more interface(s) 1806, one or more mass storage device(s) 1808, and one or more Input/Output (I/O) device(s) 1810, all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM)) and/or nonvolatile memory (e.g., read-only memory (ROM)). Memory device(s) 1804 may also include rewritable ROM, such as Flash memory.

Mass storage device(s) 1808 include various computer readable media, such as magnetic tapes, magnetic disks, optical disks, solid state memory (e.g., Flash memory), and so forth. Various drives may also be included in mass storage device(s) 1808 to enable reading from and/or writing to the various computer readable media. Mass storage device(s) 1808 include removable media and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, lenses, CCDs or other image capture devices, and the like.

Interface(s) 1806 include various interfaces that allow computing device 1800 to interact with other systems, devices, or computing environments. Example interface(s) 1806 include any number of different network interfaces, such as interfaces to local area networks (LANs), wide area networks (WANs), wireless networks, and the Internet.

Bus 1812 allows processor(s) 1802, memory device(s) 1804, interface(s) 1806, mass storage device(s) 1808, and I/O device(s) 1810 to communicate with one another, as well as other devices or components coupled to bus 1812. Bus 1812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1800 and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

EXAMPLES

The following examples pertain to further embodiments.

Example 1 is a method for managing data skew. The method includes: computing a hash value for a join operation; detecting data skew on a probe side of the join operation at a runtime of the join operation using a light-weight sketch data structure; identifying a frequent probe-side join key on the probe side of the join operation during a probe phase of the join operation; identifying a frequent build-side row having a build-side join key corresponding with the frequent probe-side join key; and asynchronously distributing the frequent build-side row to one or more remote servers.

Example 2 is a method as in Example 1, wherein the one or more remote servers is configured to: asynchronously receive the frequent build-side row; and generate a separate hash table for the frequent build-side row.

Example 3 is a method as in any of Examples 1-2, further including: selecting a rowset comprising a plurality of rows of the join operation; and probing each of the plurality of rows of the rowset into a space saving algorithm using the hash value for the join operation.

Example 4 is a method as in any of Examples 1-3, updating the space saving algorithm based on incoming data; and for each update to the space saving algorithm, identifying a frequency indicating how frequently the frequent probe-side join key is probed as a side-effect of the updating the space saving algorithm.

Example 5 is a method as in any of Examples 1-4, wherein asynchronously distributing the frequent build-side row to the one or more remote servers comprises: in response to the frequency exceeding a predetermined threshold, asynchronously distributing the frequent build-side row to the one or more remote servers; and in response to the frequency not exceeding the predetermined threshold, retaining the frequent build-side row on a current server.

Example 6 is a method as in any of Examples 1-5, further including: calculating a total number of rows of the join operation that have been probed into the space saving algorithm; calculating a threshold per worker thread based on the total number of rows of the join operation that have been probed into the space saving algorithm; and based on the threshold per worker thread, determining whether the frequent build-side join key is frequent among all threads of at least one server.

Example 7 is a method as in any of Examples 1-6, wherein asynchronously distributing the frequent build-side row to the one or more remote servers comprises one of: broadcasting the frequent build-side row to each of a plurality of available remote servers; or broadcasting the frequent build-side row only to one or more remote servers that frequently transmitted the frequent build-side join key.

Example 8 is a method as in any of Examples 1-7, further comprising altering an input link of a server to route a frequent probe-side row comprising the frequent probe-side join key to a local instance of the join operation such that network traffic is reduced.

Example 9 is a method as in any of Examples 1-8, wherein asynchronously distributing the frequent build-side row to the one or more remote servers occurs only after determining, to a threshold confidence level, that the frequent probe-side join key is frequent on a server.

Example 10 is a method as in any of Examples 1-9, wherein the lightweight sketch data structure comprises a hash table space saving algorithm.

Example 11 is non-transitory computer readable storage media storing instructions that, when executed by one or more processors, cause the one or more processors to: compute a hash value for a join operation; detect data skew on a probe side of the join operation at a runtime of the join operation using a lightweight sketch data structure; identify a frequent probe-side join key on the probe side of the join operation during a probe phase of the join operation; identify a frequent build-side row having a build-side join key corresponding with the frequent probe-side join key; and asynchronously distribute the frequent build-side row to one or more remote servers.

Example 12 is non-transitory computer readable storage media as in Example 11, wherein the instructions further cause the one or more processors to: select a rowset comprising a plurality of rows of the join operation; and probe each of the plurality of rows of the rowset into a space saving algorithm using the hash value for the join operation.

Example 13 is non-transitory computer readable storage media as in any of Examples 11-12, wherein the instructions further cause the one or more processors to: update the space saving algorithm based on incoming data; and for each update to the space saving algorithm, identify a frequency indicating how frequently the frequent probe-side join key is probed as a side-effect of the one or more processors updating the space saving algorithm.

Example 14 is non-transitory computer readable storage media as in any of Examples 11-13, wherein causing the one or more processors to asynchronously distribute the frequent build-side row to the one or more remote servers comprises: in response to the frequency exceeding a predetermined threshold, asynchronously distribute the frequent build-side row to the one or more remote servers; and in response to the frequency not exceeding the predetermined threshold, retaining the frequent build-side row on a current server.

Example 15 is non-transitory computer readable storage media as in any of Examples 11-14, wherein the instructions further cause the one or more processors to: calculate a total number of rows of the join operation that have been probed into the space saving algorithm; calculate a threshold per worker thread based on the total number of rows of the join operation that have been probed into the space saving algorithm; and based on the threshold per worker thread, determining whether the frequent build-side join key is frequent among all threads of at least one server.

Example 16 is non-transitory computer readable storage media as in any of Examples 11-15, wherein causing the one or more processors to asynchronously distribute the frequent build-side row to the one or more remote servers comprises one of: broadcasting the frequent build-side row to each of a plurality of available remote servers; or broadcasting the frequent build-side row only to one or more remote servers that frequently transmitted the frequent build-side join key.

Example 17 is non-transitory computer readable storage media as in any of Examples 11-16, wherein the instructions further cause the one or more processors to alter an input link of a server to route a frequent probe-side row comprising the frequent probe-side join key to a local instance of the join operation such that network traffic is reduced.

Example 18 is a system for managing data skew. The system includes: a means for computing a hash value for a join operation; a means for detecting data skew on a probe side of the join operation at a runtime of the join operation using a lightweight sketch data structure; a means for identifying a frequent probe-side join key on the probe side of the join operation during a probe phase of the join operation; a means for identifying a frequent build-side row having a build-side join key corresponding with the frequent probe-side join key; and a means for asynchronously distributing the frequent build-side row to one or more remote servers.

Example 19 is a system as in Example 18, further including: a means for selecting a rowset comprising a plurality of rows of the join operation; and a means for probing each of the plurality of rows of the rowset into a space saving algorithm using the hash value for the join operation.

Example 20 is a system as in any of Examples 18-19, further including: a means for updating the space saving algorithm based on incoming data; and for each update to the space saving algorithm, a means for identifying a frequency indicating how frequently the frequent probe-side join key is probed as a side-effect of the updating the space saving algorithm.

Example 21 is a system as in any of Examples 18-20, wherein the means for asynchronously distributing the frequent build-side row to the one or more remote servers is further configured to: in response to the frequency exceeding a predetermined threshold, asynchronously distribute the frequent build-side row to the one or more remote servers; and in response to the frequency not exceeding the predetermined threshold, retaining the frequent build-side row on a current server.

Example 22 is a system as in any of Examples 18-21, further including: a means for calculating a total number of rows of the join operation that have been probed into the space saving algorithm; a means for calculating a threshold per worker thread based on the total number of rows of the join operation that have been probed into the space saving algorithm; and a means for determining, based on the threshold per worker thread, whether the frequent build-side join key is frequent among all threads of at least one server.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to more particularly emphasize their implementation independence.

For example, a component or module may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method for managing data skew, the method comprising:
   detecting, by a local server comprising at least one hardware processor, data skew on a probe side of a join operation at a runtime of the join operation using a lightweight sketch data structure;
   identifying, by the local server, a frequent probe-side join key on the probe side of the join operation during a probe phase of the join operation;
   identifying, by the local server, a frequent build-side row having a frequent build-side join key corresponding to the identified frequent probe-side join key;
   asynchronously distributing, by the local server in response to detecting the data skew on the probe side of the join operation, the identified frequent build-side row to a plurality of remote servers that frequently transmitted the frequent build-side join key;
   asynchronously receiving, by each of the plurality of remote servers, the identified frequent build-side row; and
   altering, by each of the plurality of remote servers, an input link to route a frequent probe-side row comprising the identified frequent probe-side join key to a local instance of the join operation.

2. The method of claim 1, wherein each of the plurality of remote servers is configured to generate a separate hash table for the identified frequent build-side row.

3. The method of claim 1, further comprising:
   computing, by the local server, a hash value for the join operation;
   selecting, by the local server, a rowset comprising a plurality of rows of the join operation; and
   probing, by the local server, each of the plurality of rows of the rowset into a space saving algorithm using the hash value for the join operation.

4. The method of claim 3, further comprising:
   updating, by the local server, the space saving algorithm based on incoming data; and identifying, by the local server for each update to the space saving algorithm, a frequency indicating how frequently the identified frequent probe-side join key is probed as a side-effect of updating the space saving algorithm.

5. The method of claim 4, wherein asynchronously distributing the identified frequent build-side row to the plurality of remote servers is also in response to the identified frequency exceeding a predetermined threshold.

6. The method of claim 3, further comprising:
   calculating, by the local server, a total number of rows of the join operation that have been probed into the space saving algorithm;
   calculating, by the local server, a threshold per worker thread based on the total number of rows of the join operation that have been probed into the space saving algorithm; and
   determining, by the local server based on the threshold per worker thread, whether the frequent build-side join key is frequent among all threads of at least one server among the local server and the plurality of remote servers.

7. The method of claim 1, wherein asynchronously distributing the identified frequent build-side row to the plurality of remote servers occurs only after determining, by the local server to a threshold confidence level, that the identified frequent probe-side join key is frequent on the local server.

8. Non-transitory computer readable storage media storing instructions that, when executed by one or more hardware processors, cause the one or more hardware processors to perform operations comprising:

detecting, by a local server, data skew on a probe side of a join operation at a runtime of the join operation using a lightweight sketch data structure;

identifying, by the local server, a frequent probe-side join key on the probe side of the join operation during a probe phase of the join operation;

identifying, by the local server, a frequent build-side row having a frequent build-side join key corresponding to the identified frequent probe-side join key;

asynchronously distributing, by the local server in response to detecting the data skew on the probe side of the join operation, the identified frequent build-side row to a plurality of remote servers that frequently transmitted the frequent build-side join key;

asynchronously receiving, by each of the plurality of remote servers, the identified frequent build-side row; and altering, by each of the plurality of remote servers, an input link to route a frequent probe-side row comprising the identified frequent probe-side join key to a local instance of the join operation.

9. The non-transitory computer readable storage media of claim 8, the operations further comprising:

computing, by the local server, a hash value for the join operation, selecting, by the local server, a rowset comprising a plurality of rows of the join operation; and probing, by the local server, each of the plurality of rows of the rowset into a space saving algorithm using the hash value for the join operation.

10. The non-transitory computer readable storage media of claim 9, the operations further comprising:

updating, by the local server, the space saving algorithm based on incoming data; and identifying, by the local server for each update to the space saving algorithm, a frequency indicating how frequently the identified frequent probe-side join key is probed as a side-effect of updating the space saving algorithm.

11. The non-transitory computer readable storage media of claim 10, wherein asynchronously distributing the identified frequent build-side row to the plurality of remote servers is also in response to the identified frequency exceeding a predetermined threshold.

12. The non-transitory computer readable storage media of claim 9, the operations further comprising:

calculating, by the local server, a total number of rows of the join operation that have been probed into the space saving algorithm;

calculating, by the local server, a threshold per worker thread based on the total number of rows of the join operation that have been probed into the space saving algorithm; and determining, by the local server based on the threshold per worker thread, whether the frequent build-side join key is frequent among all threads of at least one server among the local server and the plurality of remote servers.

13. The non-transitory computer readable storage media of claim 8, wherein each of the plurality of remote servers is configured to generate a separate hash table for the identified frequent build-side row.

14. The non-transitory computer readable storage media of claim 8, wherein asynchronously distributing the identified frequent build-side row to the plurality of remote servers occurs only after determining, by the local server to a threshold confidence level, that the identified frequent probe-side join key infrequent on the local server.

15. A system for managing data skew, the system comprising:

a local server comprising:

at least one local-server hardware processor; and one or more local-server non-transitory computer readable storage media containing local-server instructions that, when executed by the at least one local-server hardware processor, cause the at least one local-server hardware processor to perform local-server operations comprising:

detecting data skew on a probe side of a join operation at a runtime of the join operation using a lightweight sketch data structure;

identifying a frequent probe-side join key on the probe side of the join operation during a probe phase of the join operation;

identifying a frequent build-side row having a frequent build-side join key corresponding to the frequent probe-side join key; and asynchronously distributing, in response to detecting the data skew on the probe side of the join operation, the identified frequent build-side row to a plurality of remote servers that frequently transmitted the frequent build-side join key; and the plurality of remote servers each comprising:

at least one remote-server hardware processor; and one or more remote-server non-transitory computer readable storage media containing remote-server instructions that, when executed by the at least one remote-server hardware processor, cause the at least one remote-server hardware processor to perform remote-server operations comprising:

asynchronously receiving the identified frequent build-side row; and altering an input link to route a frequent probe-side row comprising the identified frequent probe-side join key to a local instance of the join operation.

16. The system of claim 15, the local-server operations further comprising:

computing a hash value for the join operation;

selecting a rowset comprising a plurality of rows of the join operation; and probing each of the plurality of rows of the rowset into a space saving algorithm using the hash value for the join operation.

17. The system of claim 16, the local-server operations further comprising:

updating the space saving algorithm based on incoming data; and identifying, for each update to the space saving algorithm, a frequency indicating how frequently the identified frequent probe-side join key is probed as a side-effect of updating the space saving algorithm.

18. The system of claim 17, wherein asynchronously distributing the identified frequent build-side row to the plurality of remote servers is also in response to the identified frequency exceeding a predetermined threshold.

19. The system of claim 16, the local-server operations further comprising:

calculating a total number of rows of the join operation that have been probed into the space saving algorithm;

calculating a threshold per worker thread based on the total number of rows of the join operation that have been probed into the space saving algorithm; and determining, based on the threshold per worker thread, whether the frequent build-side join key is frequent among all threads of at least one server among the local server and the plurality of remote servers.

20. The system of claim 15, wherein each of the plurality of remote servers is configured to generate a separate hash table for the identified frequent build-side row.

21. The system of claim 15, wherein asynchronously distributing the identified frequent build-side row to the plurality of remote servers occurs only after determining, by the local server to a threshold confidence level, that the identified frequent probe-side join key is frequent on the local server.

* * * * *

UNITED STATES PATENT AND TRADEMARK OFFICE
CERTIFICATE OF CORRECTION

PATENT NO. : 10,970,282 B2  Page 1 of 1
APPLICATION NO. : 16/005182
DATED : April 6, 2021
INVENTOR(S) : Funke et al.

It is certified that error appears in the above-identified patent and that said Letters Patent is hereby corrected as shown below:

On the Title Page

Item (56) on page 2, in Column 2, under "Other Publications", Line 16, delete "Prelirninary" and insert --Preliminary-- therefor In the Claims In Column 22, Line 40, in Claim 4, after "and", insert --linebreak--

In Column 23, Line 30, in Claim 9, delete "operation," and insert --operation;-- therefor In Column 24, Line 6, in Claim 14, delete "infrequent" and insert --is frequent-- therefor Signed and Sealed this
Seventeenth Day of August, 2021

Drew Hirshfeld
*Performing the Functions and Duties of the
Under Secretary of Commerce for Intellectual Property and
Director of the United States Patent and Trademark Office*